United States Patent [19]

Shimomura et al.

[11] Patent Number: 5,440,501
[45] Date of Patent: Aug. 8, 1995

[54] ENERGY SAVING CAPACITANCE TYPE MEASURING DEVICE FOR ABSOLUTE MEASUREMENT OF POSITIONS

[75] Inventors: Toshitaka Shimomura; Satoshi Adachi; Toru Yaku; Tatsuhiko Matsuura; Osamu Kawatoko, all of Kawasaki, Japan

[73] Assignee: Mitutoyo Corporation, Tokyo, Japan

[21] Appl. No.: 74,952

[22] Filed: Jun. 10, 1993

[30] Foreign Application Priority Data

Jun. 26, 1992 [JP] Japan .................................. 4-193231
Jul. 10, 1992 [JP] Japan .................................. 4-207321

[51] Int. Cl.⁶ .......................... G01B 3/20; G01B 3/18
[52] U.S. Cl. .................................. 364/560; 364/561; 364/562; 364/563; 364/579; 324/662; 33/706
[58] Field of Search ............... 364/579, 560, 561, 562, 364/563, 707; 33/706, 784; 324/690, 662, 660, 664; 368/66; 136/293, 243, 206; 323/906; 395/750

[56] References Cited

U.S. PATENT DOCUMENTS

| | | | |
|---|---|---|---|
| 4,420,745 | 12/1983 | Dray et al. | 340/510 |
| 4,586,260 | 5/1986 | Baxter et al. | 324/664 X |
| 4,634,953 | 1/1987 | Shoji et al. | 136/293 X |
| 4,702,613 | 10/1987 | Ohtawa | 368/66 |
| 4,879,508 | 11/1989 | Andermo | 324/690 |
| 4,974,164 | 11/1990 | Lewis et al. | 364/562 |

Primary Examiner—Ellis B. Ramirez
Assistant Examiner—M. Kemper
Attorney, Agent, or Firm—Oliff & Berridge

[57] ABSTRACT

A capacitance-type measuring device for absolute measurement of positions is disclosed, which comprises a displacement sensor having a fixed element and a movable element, the movable element being capacitance-coupled to the fixed element and relatively movable against the fixed element, the displacement sensor being adapted to output signals corresponding to relative positions of the movable element against the fixed element, a signal processing circuit for processing the output signals of the displacement sensor and outputting an absolute measurement value corresponding to displacement of the movable element against the fixed element, a control circuit for controlling the operations of the displacement sensor and the signal processing circuit, and a power supply for supplying electric power to the displacement sensor, the signal processing circuit, and the control circuit, wherein the control circuit activates the signal processing circuit at a suitable interval so as to perform an intermittent measurement operation.

23 Claims, 17 Drawing Sheets

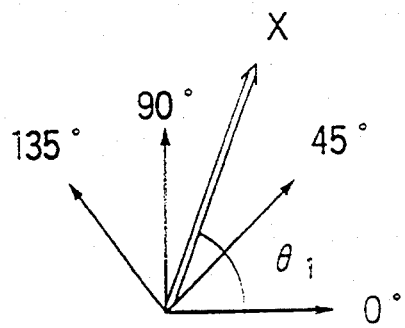
F I G. 9A
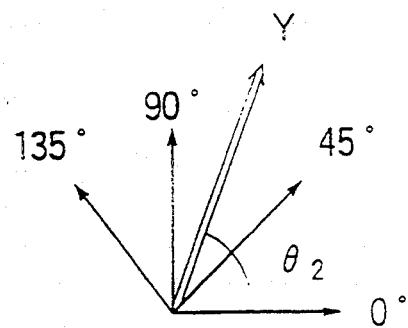
F I G. 9B
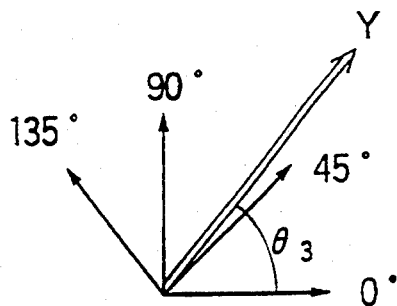
F I G. 9C

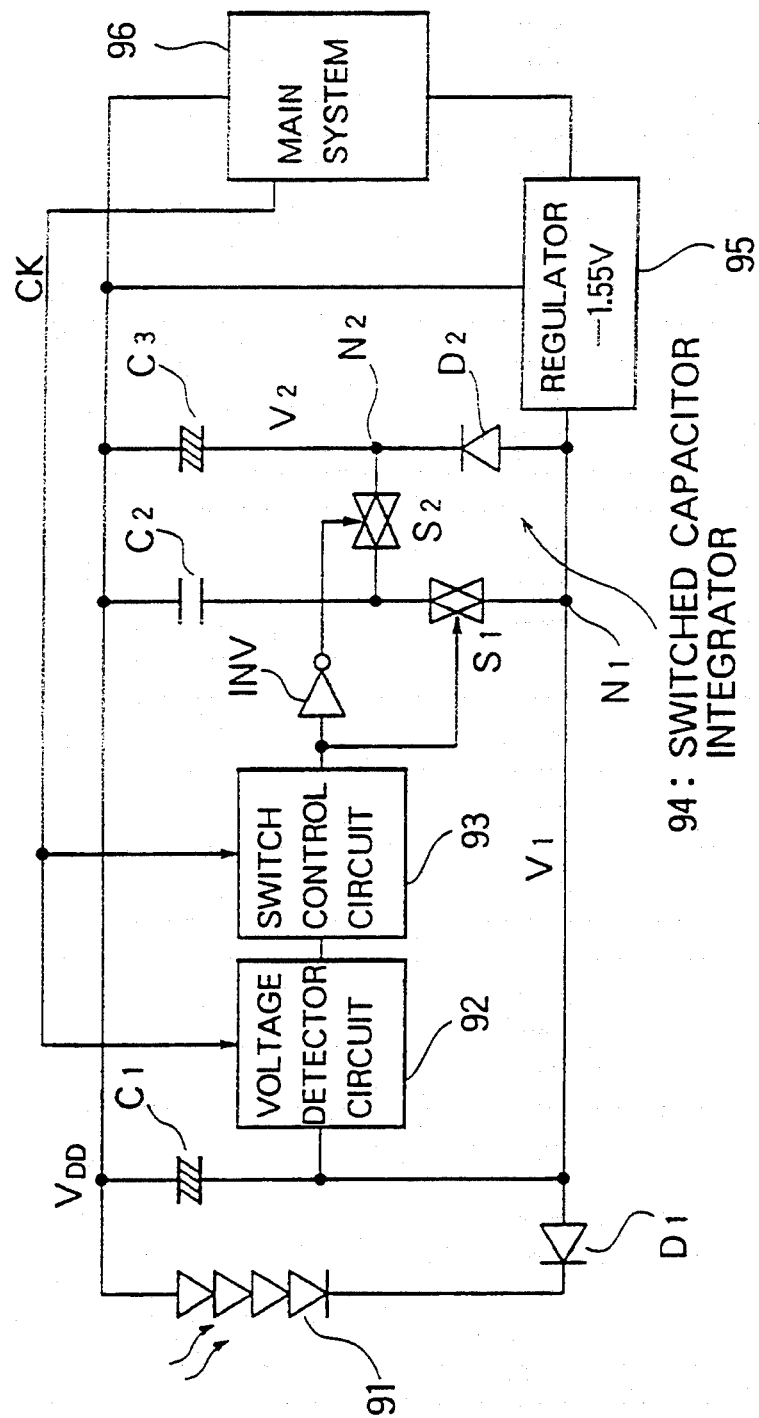
F I G. 12

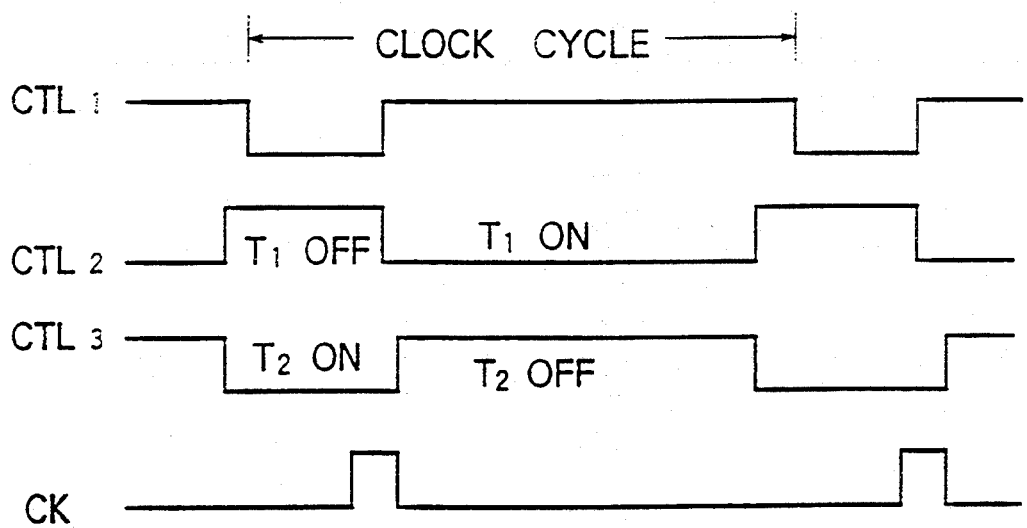
F I G . 16

ENERGY SAVING CAPACITANCE TYPE MEASURING DEVICE FOR ABSOLUTE MEASUREMENT OF POSITIONS

BACKGROUND OF THE INVENTION

The present invention relates to a displacement measuring device used for a hand-tool such as a digital vernier caliper, in particular, to a so-called capacitance-type measuring device for absolute measurement of positions based on a relative position of a movable element against a fixed element of a displacement sensor.

A growing number of small measuring devices with capacitance-type displacement sensors such as digital vernier calipers, digital micrometers, and height gauges are being used. A capacitance-type displacement sensor comprises a fixed element such as a main scale, a movable element such as a slider, the movable element being able to move against the fixed element. A large number of electrodes are disposed on the fixed element and the movable element. As the movable element moves against the fixed element, the capacitances between these electrodes change. The sensor outputs periodical changes of the capacitances as electric signals. Thus, the displacement of the moving element against the fixed element can be measured.

There are two types of displacement sensors which are categorized as incremental type and absolute type depending on the forms of output signals. An incremental type sensor continuously detects the cyclic signals so as to measure the displacement of a slider against a reference position. In contrast, an absolute type sensor measures an absolute displacement (position) of a movable element against a fixed element as opposed to the incremental type sensor. In the absolute type sensor, for example, depending on the shapes of electrode patterns formed on the fixed element and the movable element, cyclic signals with coarse pitches, medium pitches, and fine pitches are output. The phase information of these cyclic signals with these pitches is composed. Thus, an absolute displacement of the movable element is detected.

The theory of such a capacitance-type absolute displacement sensor is disclosed in the specification of U.S. Pat. No. 4,420,754. When such a displacement sensor is employed for a small measuring device, a signal processing circuit portion should be formed as an IC chip. In addition, a battery should be built in the device. To reduce the size of the battery, improve its service life, simplify its replacement procedure, and save natural resources, the average current consumption of the system should be reduced as much as possible.

SUMMARY OF THE INVENTION

An object of the present invention is to provide a capacitance-type measuring device for absolute measurement of positions for allowing the average current consumption of the system to decrease so as to reduce the size of the power supply thereof and prolong the service life thereof.

The capacitance-type measuring device for absolute measurement of positions according to the present invention comprises a displacement sensor having a fixed element and a movable element, the movable element being capacitance-coupled to the fixed element and relatively movable against the fixed element, the displacement sensor being adapted to output signals corresponding to relative positions of the movable element against the fixed element, a signal processing circuit for processing the output signals of the displacement sensor and outputting an absolute measurement value corresponding to displacement of the movable element against the fixed element, a control circuit for controlling the operations of the displacement sensor and the signal processing circuit, and a power supply for supplying electric power to the displacement sensor, the signal processing circuit, and the control circuit, wherein the control circuit includes activation control means for periodically activating the signal processing circuit at a suitable interval so as to perform an intermittent measurement operation.

The power source of the absolute type measuring device according to this invention needs to be connected only when the final measurement position is to be measured. However, if the power source is connected only at a timing of the final measurement position, the data display does not follow the movement of the displacement sensor, so that the data display becomes to be unnatural. On the other hand, if the power source is continuously supplied to the device, the power consumption becomes to be very large. According to this invention, the power consumption of the device is effectively reduced with a natural data display.

In the present invention, the intervals of periodic measurement are variably controlled according to several methods that follow.

In a first method, the intervals of intermittent measurement are variably controlled depending on whether a movable element of a displacement sensor moves or stops against a fixed element thereof (namely, whether or not the displacement sensor moves or stops). When the displacement sensor stops for a particular period of time, the intervals of this measurement become longer than the normal measurement does. When a predetermined long period of time elapsed, the power supply is turned off. Thus, since the intervals of measurement are variably controlled depending on the operation state of the displacement sensor, the average power consumption of the system decreases. For example, in the case of digital vernier calipers, the period of time that its sensor stops is much longer than the period of time that it moves. Thus, as with the present invention, when the intervals of periodic measurement in the absolute type displacement sensor are variably controlled, the average current consumption can be effectively reduced. As a result, the size of the battery can be reduced and the service life thereof can be prolonged.

In a second method, the intervals of intermittent measurement are variably controlled depending on the voltage levels of the power supply of the system. When the voltage level of the power supply becomes lower than a predetermined level, for example the intervals of measurement are prolonged. Thus, the average current consumption of the system can be reduced with a low voltage power supply, and the system can be securely operated at lower voltages than the prior art reference. Moreover, the size of the battery of the power supply can be reduced and the service life thereof can be prolonged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF DRAWINGS

FIG. 9A is a schematic diagram for explaining the theory of the pollution detection;

FIG. 9B is another schematic diagram for explaining the theory of the pollution detection;

FIG. 9C is a further schematic diagram for explaining the theory of the pollution detection;

FIG. 12 is a block diagram showing the construction of a power supply circuit according to a fifth embodiment;

FIG. 16 is a waveform diagram for explaining the circuit operations of FIG. 15;

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE PREFERRED EMBODIMENTS

Figure 1:
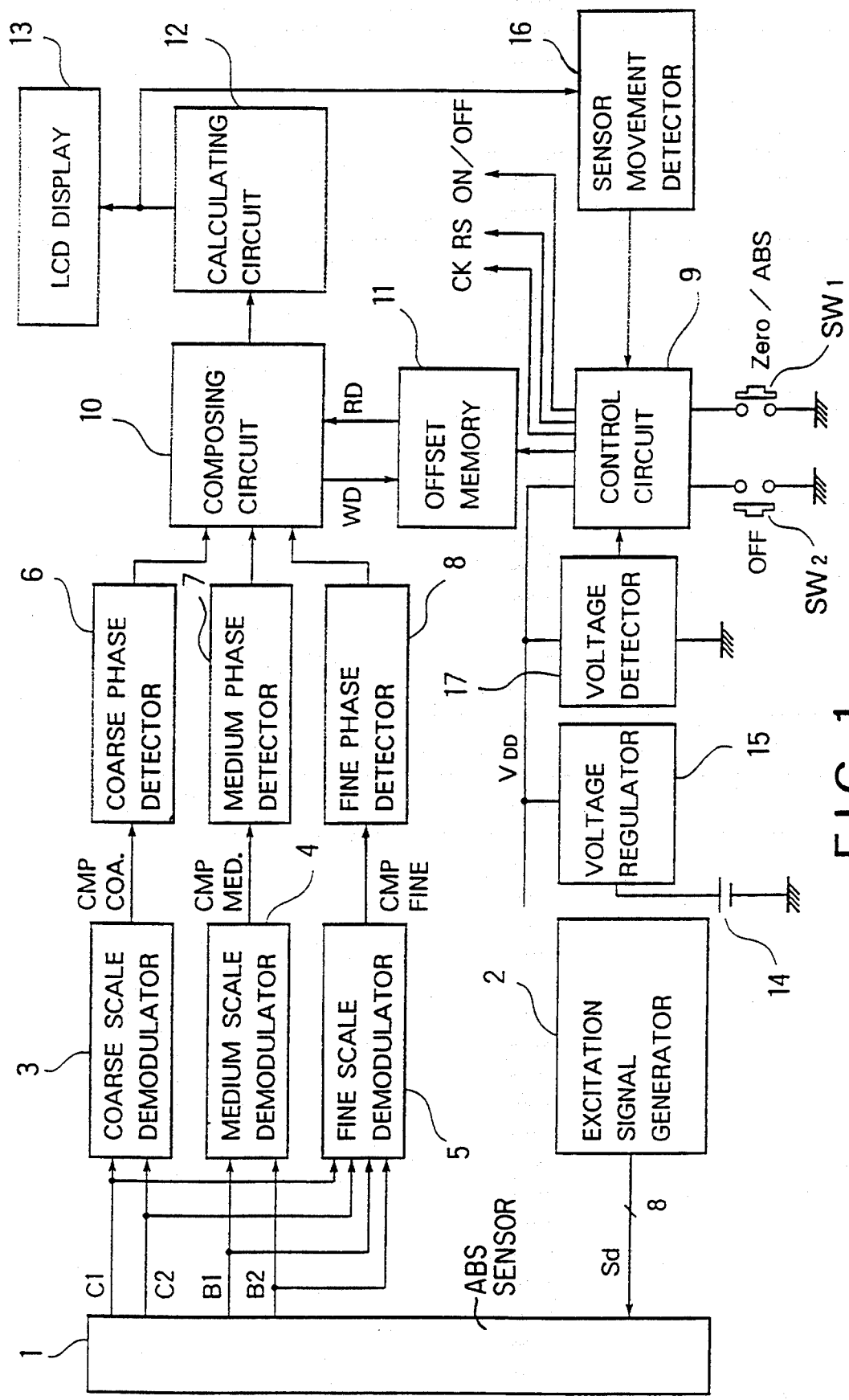
FIG. 1 is a block diagram showing the construction of a displacement measuring device according to an embodiment of the present invention.

Referring to FIG. 1, a displacement measuring device according to a first embodiment of the present invention is shown. In the displacement measuring device, the measurement operation, output signals of an absolute type displacement sensor (hereinafter, this sensor is referred to as the ABS sensor) 1 are processed, is intermittently performed. Since the ABS sensor 1 does not need a continuous counting operation as opposed to an incremental type displacement sensor, it can obtain absolute positions in a short period of time. Thus, the ABS sensor 1 can perform an intermittent measurement. In this embodiment, the intervals of intermittent measurement maybe variably controlled depending on whether the displacement sensor 1 is moving or stopping.

Figure 2A:
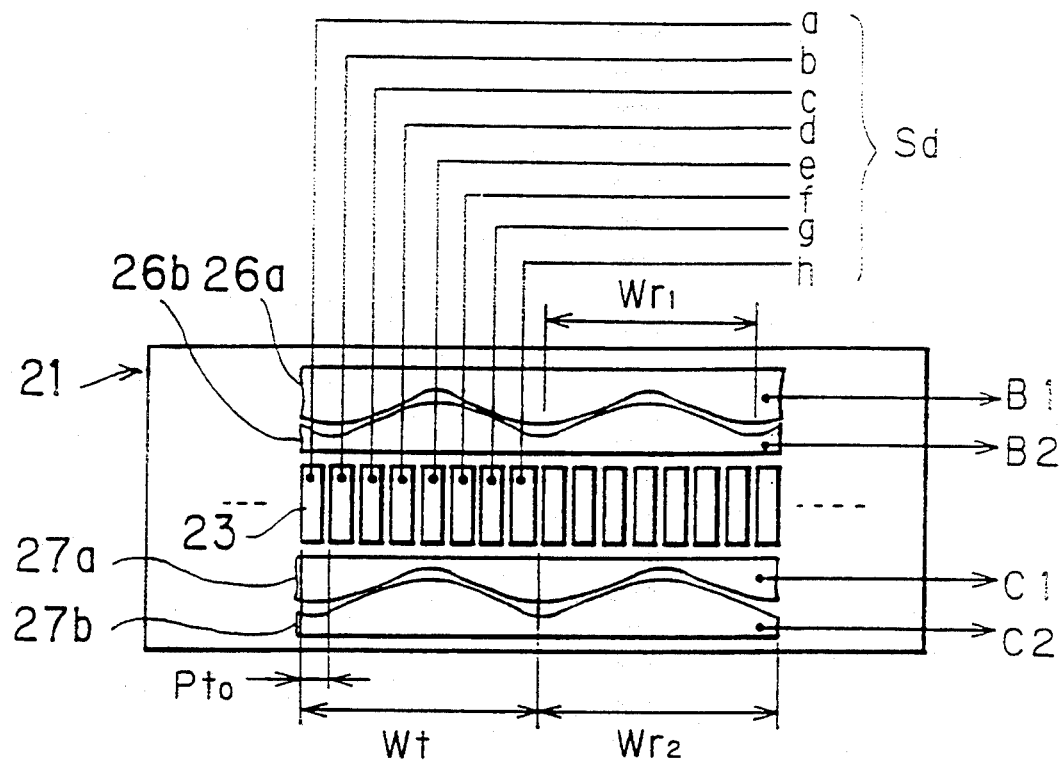
FIG. 2A is a schematic diagram showing the construction of a slider of a displacement sensor according first embodiment.
Figure 2B:
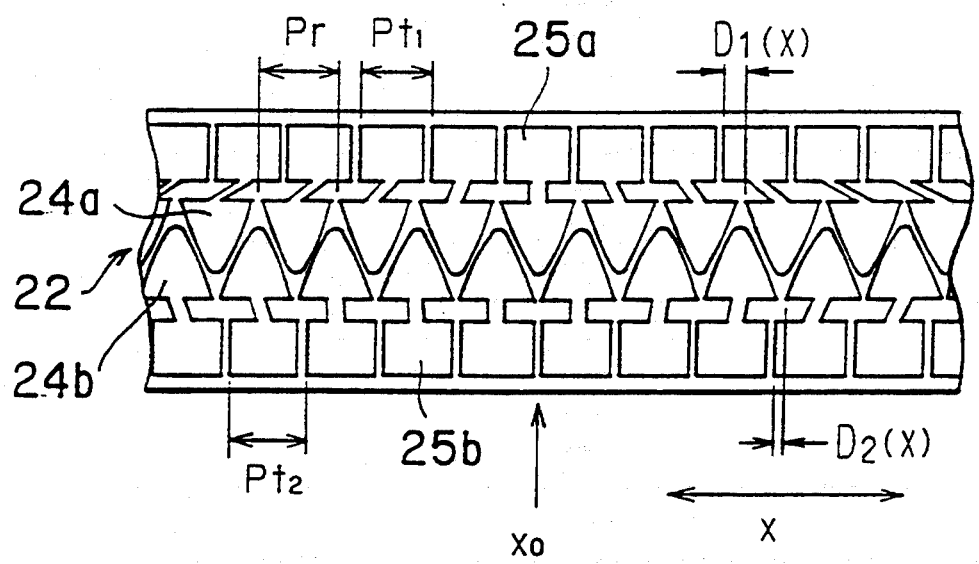
FIG. 2 is a schematic diagram showing the construction of a main scale of the displacement sensor according to the first embodiment.

The ABS sensor 1 comprises a slider 21 and a main scale 22. The slider 21 is a movable element shown in FIG. 2A, whereas the main scale 22 which is a fixed element shown in FIG. 2B. The slider 21 and the main scale 22 are spaced apart for a predetermined small distance. The slider 21 is movable in the direction of measurement axis X. At a center portion of the slider 21, a plurality of first transmitter electrodes 23 are disposed at predetermined pitches Pt0 in the longitudinal direction of the slider 21. The first transmitter electrodes 23 are capacitance-coupled to receiver electrodes 24a and 24b disposed at pitches Pr on the main scale 22. The receiver electrodes 24a and 24b are disposed in a pattern of a triangle or a sine wave. The receiver electrodes 24a and 24b are connected to second transmitter electrodes 25a and 25b disposed adjacent thereto, respectively. The second transmitter electrodes 25a and 25b are disposed at pitches Pt1 and Pt2, respectively. The transmitter electrodes 25a are capacitance-coupled to detector electrodes 26a and 26b disposed on the slider 21. The transmitter electrodes 25b are capacitance-coupled to detector electrodes 27a and 27b disposed on the slider 21, respectively. The detector electrodes 26a and 26b are disposed one after the other at pitches Wr1 (=3 Pt1). The detector electrodes 27a and 27b are disposed one after the other at pitches Wr2 (=3 Pt2).

The first-transmitter electrodes 23 are commonly connected at intervals of eight so as to form a plurality of eight-electrode groups. An excitation signal Sd consisting of eight-phase cyclic signals whose phases differ each other by 45o is supplied to each eight-electrode group. The excitation signal Sd is a signal where a sine wave signal has been chopped by high frequency pulses. The excitation signal Sd is generated by an excitation signal generator 2 shown in FIG. 1 and output therefrom.

Pitches Wt of electric field patterns which take place at the first transmitter electrodes 23 by the excitation signal Sd are eight times higher than the pitches Pt0 of the transmitter electrodes 23. The pitches Wt are N times higher than the pitches Pr of the receiver electrodes 24a and 24b. The value of N is preferably an odd number such as 1, 3, 5, and so forth. In this embodiment, the value of N is designated to 3. Thus, successive eight transmitter electrodes 23 are usually capacitance-coupled to three or four receiver electrodes 24a or 24b.

When the excitation signal is supplied to the first transmitter electrodes 23, the detector electrodes 26a, 26b, 27a, and 27b generate respective output signals corresponding to the intensity of the capacitance-coupling between the first transmitter electrodes 23 and the receiver electrodes 24a and 24b and the intensity of the capacitance-coupling between the second transmitter electrodes 25a and 25b and the detector electrodes 26a, 26b, 27a, and 27b. The phases of signals received by the receiver electrodes 24a and 24b depend on the capacitance-coupling areas between the first transmitter electrodes 23 and the corresponding receiver electrodes 24a and 24b. These coupling areas vary depending on the relative position of the slider 21 against the main scale 22.

When the pitches of the receiver electrodes 24a and 24b are the same as the pitches of the second transmitter electrodes 25a and 25b, the detector electrodes 26a, 26b, 27a, and 27b detect cyclic signals which are generated whenever the X position of the main scale 21 deviates for the pitch Pr. In the ABS sensor 1 according to this embodiment, to detect three levels of displacement which are coarse displacement (coarse scale), medium displacement (medium scale), and fine displacement (fine scale), the second electrodes 25a and 25b have offsets D1(x) and D2(x) for the corresponding receiver electrodes 24a and 24b, respectively. The offsets D1(x) and D2(x) are functions with respect to the distance x measured from a reference position X0. The offsets D1(x) and D2(x) are given by the following formulas.

$$D1(x) = (Pr - Pt1)x/Pr \quad (1)$$

$$D2(x) = (Pr - Pt2)x/Pr \quad (2)$$

When the pitches of waveform patterns of the detection electrodes 26a, 26b, 27a, and 27b which are capacitance-coupled to the second transmitter electrodes 25a and 25b are set so that the relations of Wr1=3Pt1 and Wr2=3Pt2 are satisfied, the detector electrodes 26a and 26b output signals B1 and B2 where short periods corresponding to the waveform patterns of the detector electrodes 26a and 26b are superimposed on long periods corresponding to the offset D1(x), respectively. Likewise, the detector electrodes 27a and 27b output signals C1 and C2 where short periods corresponding to waveform patterns of the detector electrodes 27a and 27b are superimposed on long periods corresponding to the offset D2(x), respectively.

The phases of the longer period components of the signals B1 and B2 are inverse, whereas the phases of the shorter period components thereof are the same. therefore, a longer period signal is obtained by subtracting one signal from the other signal, whereas a shorter period signal is obtained by adding these signals. This can apply to the detection signals C1 and C2. When the electrode patterns are set so that the longer periods of the detection signals B1 and B2 are several ten times larger than the shorter periods of the signals B1 and B2, and that the longer periods of the detection signals C1 and C2 are several ten times larger than the longer periods of the detection signals B1 and B2, each level of displacement can be obtained by the following expressions.

$$C1 - C2 \text{ [Coarse scale]} \quad (3)$$

$$B1 - B2 \text{ [Medium scale]} \quad (4)$$

$$(B1+B2) - (C1+C2) \text{[Fine scale]} \quad (5)$$

The basic construction and theory of operation of the above-described ABS sensor are the same as those described in the above-mentioned U.S. Pat. No. 4,879,508 or the like.

The output signal (C1−C2) is processed by a coarse scale demodulator 3 and a coarse phase detector 6. The output signal (B1+B2) is processed by a medium scale demodulator 4 and a medium phase detector 7. The output signal [(B1+B2)−(C1+C2)] is processed by a fine scale demodulator 5 and a fine phase detector 8. Each demodulating process is performed by a sampling process with a chop frequency of the waveform of the excitation, a mixing process, a low path filtering process, a digitizing process, and so forth. Thereafter, a square phase signal CMP having phase information at an edge thereof is generated. In this embodiment, three types of phase signals which are a coarse scale phase signal CMP COA, a medium scale phase signal CMP MED, and a fine scale phase signal CMP FINE are obtained. The phase detectors 6, 7, and 8 detect the phases of the respective input signals by referencing the excitation signal Sd having a phase of 0o received from the excitation signal generator 2. The detected phases are output as digital values.

The output digital values of the phase detectors 6 to 8 are weighted and composed by a composing circuit 10. The composing circuit 10 receives an offset value from an offset memory 11 which is an EEPROM chip or the like. Thus, the composing circuit 10 adjusts the offset amount of the composed value. The output of the composing circuit 10 is sent to a calculating circuit 12. For example, the calculating circuit 12 converts the pitches of the electrodes into their real size values. A control circuit 9 generates activation/inactivation signals ON/OFF which are necessary for intermittent measurement, a clock signal CK, a reset signal, and so forth and outputs them to the above-described circuits. A real size value obtained by the calculating circuit 12 is displayed on an LCD display 13. In this embodiment, a built-in type small battery is used as a power supply 14 of the system. A power supply output VDD of the power supply 14 is regulated by a regulator 15 and then supplied to the entire system.

In this embodiment, a sensor displacement detector 16 is provided. The sensor displacement detector 16 monitors the output signal supplied from the calculating circuit 12 to the LCD display 13 so as to detect the movement of the ABS sensor 1. The output of the sensor displacement detector 16 is supplied to the control circuit 9. The control circuit 9 variably controls the intervals of intermittent measurement corresponding to the movement state of the ABS sensor 1.

Figure 3:
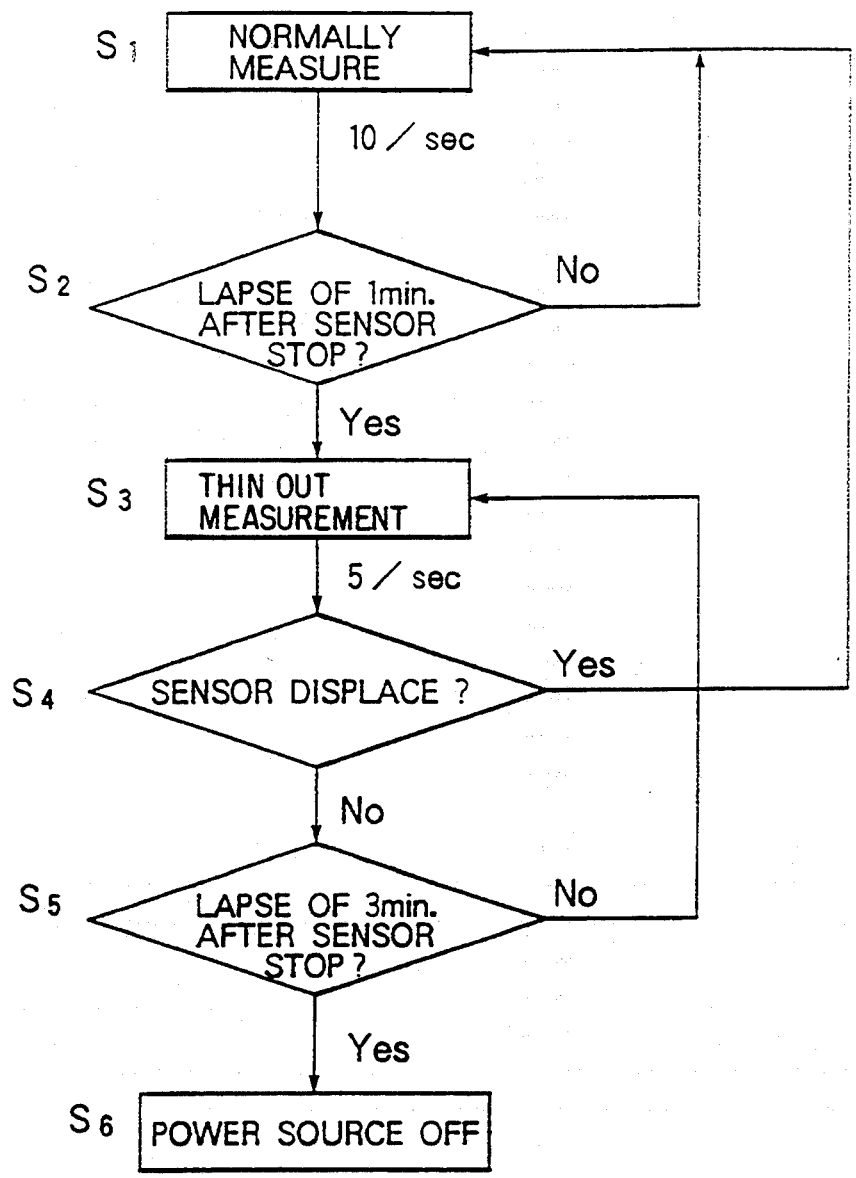
FIG. 3 is a control flow chart showing an intermittent measurement operation of the displacement measuring device according to the first embodiment.

FIG. 3 is a flow chart showing the measurement interval control operation performed by the control circuit 9 corresponding to the output of the sensor displacement detector 16. In a normal measurement mode (at step S1), a measurement is performed ten times per second (measurement period is 40 msec). When the ABS sensor 1 stops, the control circuit 9 measures the stop period of the ABS sensor 1 and determine whether or not one minute elapsed after the ABS sensor 1 had stopped (at step S2). When the control circuit 9 determines that one minute elapsed after the ABS sensor 1 had stopped, it changes the measurement mode from the normal measurement mode to a thin-out measurement mode where the measurement is performed five times per second (at step S3). When the ABS sensor 1 starts moving, the control circuit 9 restores the measurement mode to the normal measurement mode. The control circuit 9 determines whether or not the stop period of the ABS sensor 1 exceeded three minutes (at step S5). When the control circuit 9 determines that the three minutes elapsed, it turns off the power supply (at step S6).

Thus, according to this embodiment, the intervals of the intermittent measurement and the power of the system are controlled corresponding to the displacement state of the sensor 1. As a result, the average current consumption of the system can be reduced and the service life of the battery can be prolonged.

The control circuit 9 is provided with a ZERO/ABS switch SW1 and an OFF switch SW2. When the ZERO/ABS switch SW1 is pressed in the power off state, the control circuit 9 is activated and causes the LCD display 13 to display a measured value. When this switch SW1 is pressed once again, the LCD display 13 is zero-reset and displays "0". In other words, whenever the ZERO/ABS switch is pressed, measured value and zero are alternatively displayed on the LCD display 13. The OFF switch SW2 is not necessary when the power supply 14 is a solar battery.

The control circuit 9 also receives the output of a voltage detector 17 which monitors the output of the power supply. When the output of the power supply is lower than a predetermined reference value, the control circuit 9 supplies a measurement stop signal to each circuit of the system.

In the above-described embodiment, when one minute elapsed after the displacement sensor had stopped, the intervals of intermittent measurement are doubled. However, it should be noted that the stop period and the measurement period can be set to other proper values. In addition, the intervals of measurement may be changed to a plurality of levels corresponding to the stop period. Moreover, by controlling the measurement period per time unit, the same effect may be obtained. The displacement of the sensor may be detected with the output of the displacement sensor 1 or an another node signal of another signal processing circuit rather than the input signal of the LCD display. Furthermore, as the battery, a secondary battery or a solar battery may be used instead of a conventional primary battery.

Figure 4:
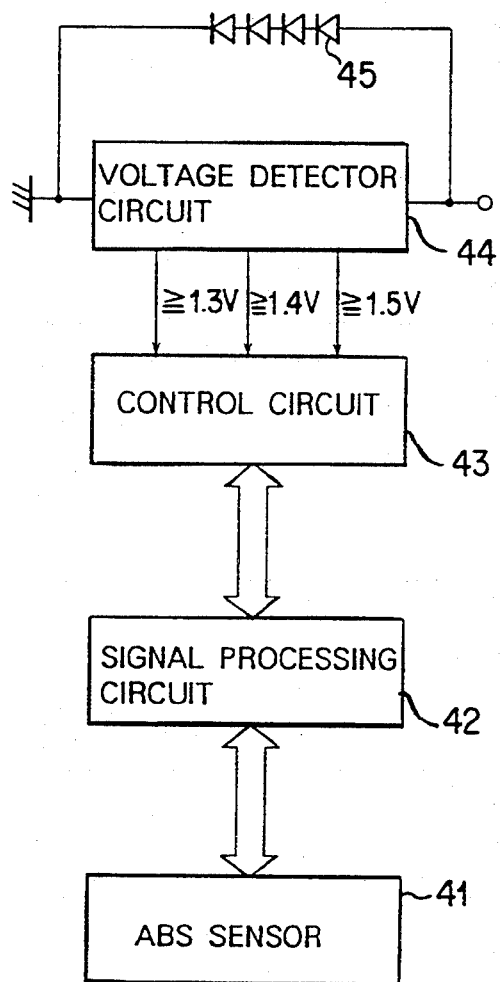
FIG. 4 is a block diagram showing the system construction of a displacement measuring device according to a second embodiment of the present invention.

FIG. 4 is a block diagram showing the construction of a displacement measuring device according to a second embodiment of the present invention. This displacement measuring device comprises an ABS sensor 41, a signal processing circuit 42, and a control circuit 43. The real construction of the ABS sensor 41 and the signal processing circuit 42 is the same as that of the above-described first embodiment. In the second embodiment, a battery or a solar cell serving as a power supply 45 of the system is used. The output voltage of the power supply 45 is always detected by a voltage detector circuit 44.

In this embodiment, instead of or in addition to the movement state of the ABS sensor, the interval of the intermittent measurement is controlled according to the voltages of the power supply. The voltage of the power supply at which the system operates is for example, 1.5 V. The voltage detector circuit 44 checks the output voltages with three threshold values of 1.5 V, 1.4 V, and 1.3 V. The control circuit 43 variably controls the measurement period per time unit for the intermittent measurement operation according to the output voltages of the voltage detector circuit 44.

Figure 6:
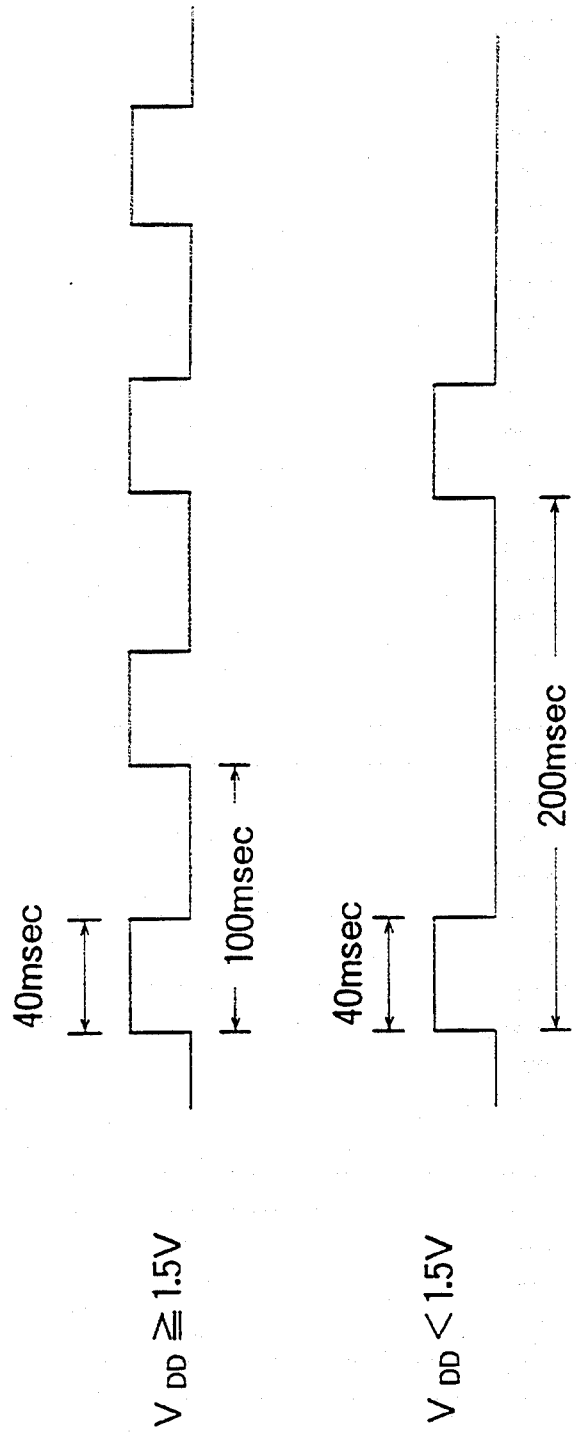
FIG. 6 is a voltage waveform diagram showing the intermittent measurement operation of the displacement measuring device according to the second embodiment.

In this embodiment, the interval of measurement is controlled as shown in FIG. 6. When the voltage of the power supply exceeds 1.5 V, the interval of measurement is set at 100 msec (namely, the measurement is performed ten times per second). When the voltage of the power supply is 1.5 V or less, the interval of measurement is set at 200 msec (namely, the measurement is performed five times per second). In these cases, the measurement period is 40 msec. As with the first embodiment, the control circuit 43 also supplies a reset signal, a clock signal, and so forth to each circuit of the system so as to control the entire system.

Figure 5:
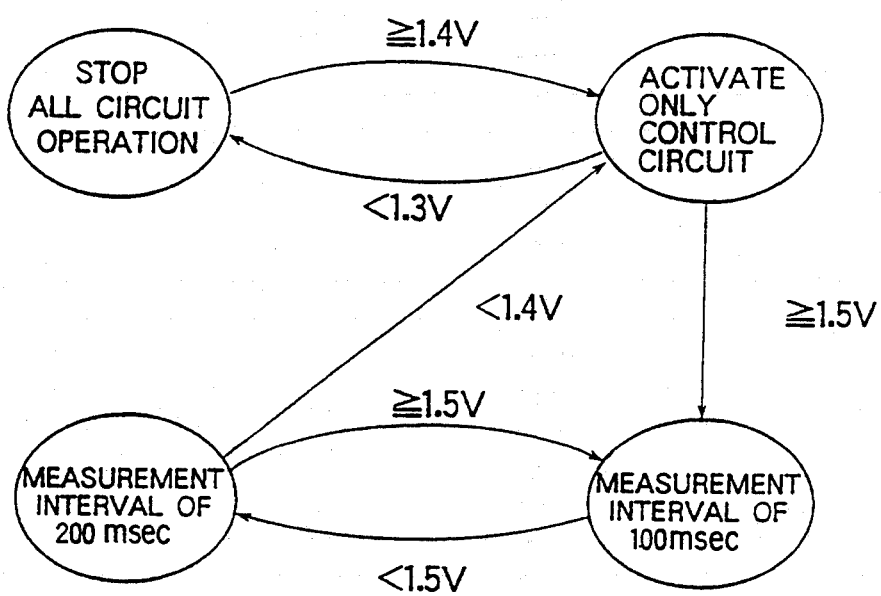
FIG. 5 is a state diagram showing the state transition of an intermittent measurement operation of the displacement measuring device according to the second embodiment.

FIG. 5 is a state diagram showing the state transition of the intermittent measurement operation of the displacement measuring device according to the second embodiment. As described above, the intervals of measurement are changed whether or not the voltage of the power supply exceeds 1.5 V. In addition, in this embodiment, when the voltage of the power supply is in the range from 1.4 V to 1.3 V, only the control circuit 43 is kept on; however, the measurement operation is stopped. This is because the control circuit 43 is kept in standby state so that it can resume immediately the measurement operation after the voltage of the power supply exceeds 1.5 V. When the voltage of the power supply is 1.3 V or less, the operations of the entire system are stopped.

In this embodiment, since the intervals of measurement are controlled according to the voltages of the power supply, the average power consumption of the system can be reduced. In particular, in the ABS sensor system using a solar cell, since the average current consumption of the system is reduced under the condition of a low intensity of illumination, the measurement operation can be performed at a lower intensity of illumination than the conventional systems. In addition, with the detected results of the output voltages of the solar cell, an alarm indication for low intensity may be issued.

In this embodiment, the intervals of measurement are controlled in two levels. However, it should be noted that the intervals of measurement may be controlled in three levels or more, or continuously corresponding to the intensity of illumination. In this embodiment, the interval of measurement is controlled with a fixed measurement period. However, it should be noted that the measurement period may be controlled with a fixed interval. In this manner, since the measurement period per time unit is controlled, the power consumption can be reduced.

In the capacitance-type displacement measuring device according to the present invention, as described above, the capacitances between the transmitter electrodes and the receiver electrodes vary just corresponding to the relation of relative positions of the slider against the main scale. Thus, it is not preferred that the capacitances vary corresponding to another factor. For example, when a polluting substance such as water is present between transmitter and receiver electrodes of the ABS sensor, the substance causes the capacitances there between to vary. Therefore, the measurement accuracy will degrade. In the following third embodiment, in addition to the normal displacement measurement mode, a pollution detection mode is also provided. In the pollution detection mode, the system automatically detects whether or not a polluting substance is present therein and displays the result.

Figure 7:
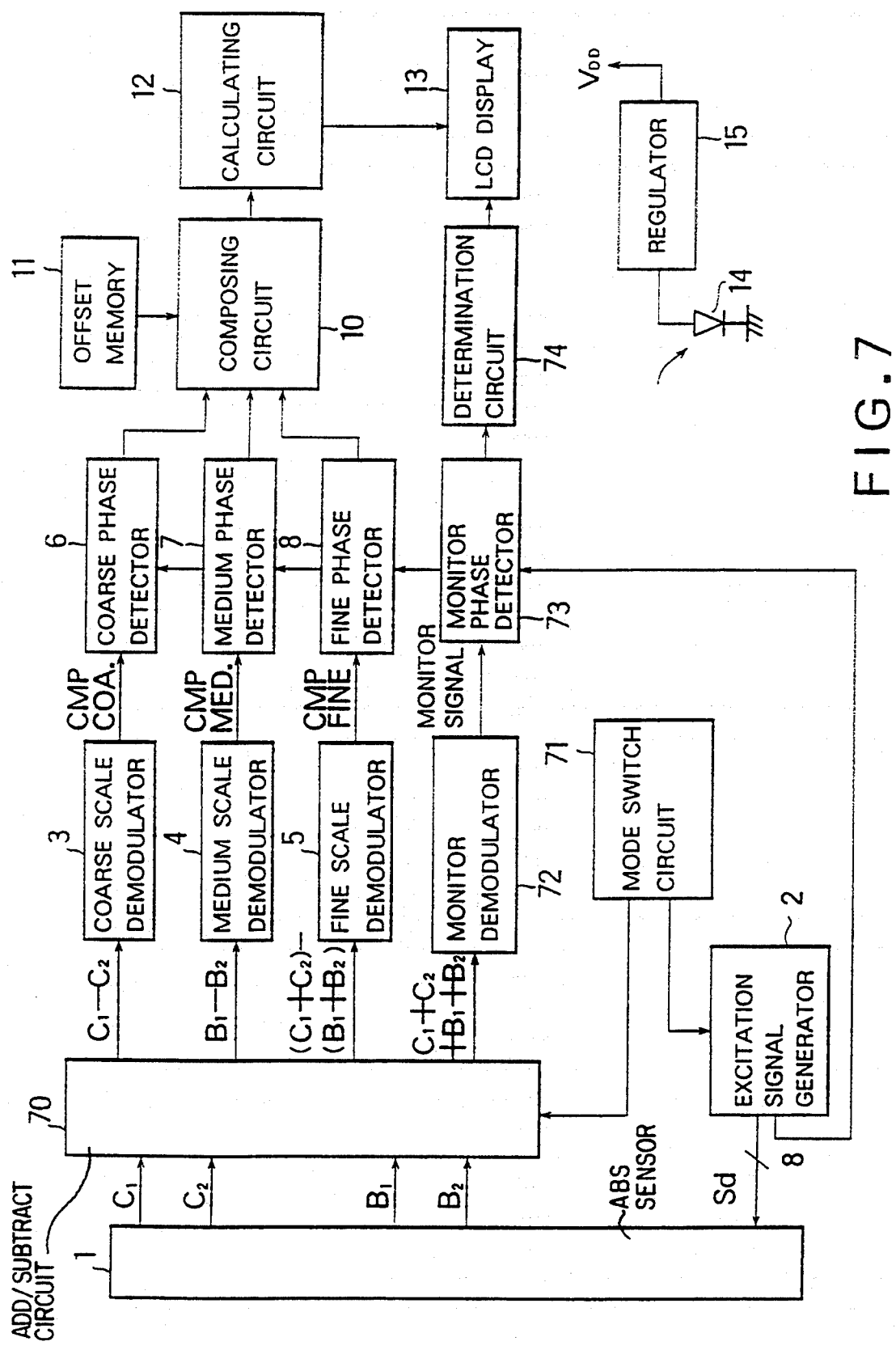
FIG. 7 is a block diagram showing the construction of a displacement measuring device according to a third embodiment of the present invention.

FIG. 7 shows the construction of a system having such a pollution detection mode. For the sake of simplicity, the portions according to FIG. 1 are denoted by the same reference numerals thereof and their description is omitted. Reference numeral 70 is an add/subtract circuit which performs the calculations of the above-described expressions (3) to (5) in the displacement measurement mode. The add/subtract circuit 70 is included in the demodulator circuits 3 to 5 shown in FIG. 1. In the pollution detection mode, the add/subtract circuit 70 receives the output of the ABS sensor 1 and performs calculations of C1+C2+B1+B2.

In this embodiment, a mode switch circuit 71 is provided to switch between the displacement measurement mode and the pollution detection mode. According to the output of the mode switch circuit 71, the add/subtract circuit 70 and an excitation signal generator 2 are controlled. As in the displacement measurement mode, the calculation output in the pollution detection mode is processed by a monitor signal demodulator 72 and a monitor phase detector 73. The monitor phase detector 73 detects the phase of a demodulated monitor signal. The output of the phase detector 73 is sent to a determination circuit 74 which determines whether or not the ABS sensor 1 is polluted.

In the pollution detection mode, a plurality of transmitter electrodes of the ABS sensor 1 are grouped as blocks. An excitation signal for detecting pollution is supplied to these blocks one after the other. When the difference of phases of detected output signals among the blocks is in a predetermined range, the determination circuit 74 determines that the ABS sensor 1 has not been polluted. Otherwise, the determination circuit 74 determines that the ABS sensor 1 has been polluted. The determined result of the determination circuit 74 is displayed on the LCD display 13. Practically, the determination circuit 74 is provided with a memory which stores a digital phase signal received from the monitor phase detector 73 so as to compare and determine the values of the phase signals received in succession.

Figure 8A:
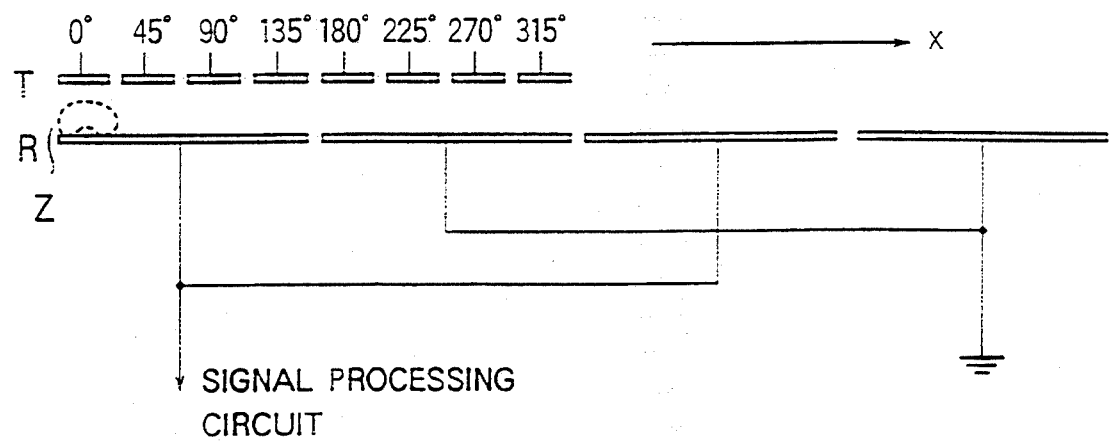
FIG. 8A is a schematic diagram for explaining a measurement mode of the third embodiment.
Figure 8B:
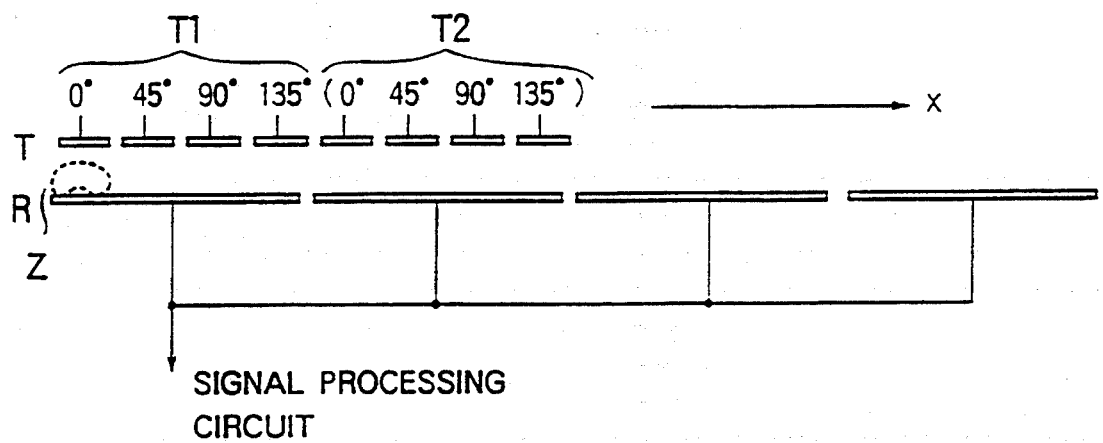
FIG. 8B a schematic diagram for explaining a pollution detection mode according to the third embodiment.

Next, the theory of operation of the pollution detection mode according to this embodiment will be described. FIG. 8A is a schematic diagram in the normal displacement measurement mode of the ABS sensor 1. FIG. 8B is a schematic diagram in the pollution detection mode. In these figures, T accords with the transmitter electrode 23 disposed on the slider 21 of FIG. 1, whereas R accords with the receiver electrodes 24a and 24b disposed on the main scale 22 of the figure.

In the normal displacement measurement mode, as shown in FIG. 8A, sine wave excitation signals whose phases differ by 45o each other (hereinafter referred to as the first transmission signals) are supplied to the eight transmitter electrodes T. In the figure, the receiver electrodes R are disposed at intervals of four transmitter electrodes T. The receiver electrodes R are alternatively connected to the signal processing circuit and ground.

On the other hand, in the pollution detection mode, as shown in FIG. 8B, the transmitter electrodes T are grouped as four-electrode blocks T1 and T2. For example, sine wave excitation signals whose phases differ by 45o each other (hereinafter referred to as the second transmission signals) are supplied to four transmitter electrodes of the block T1. Thereafter, the same excitation signals are supplied to four transmitter electrodes of the block T2. All the receiver electrodes R are connected to the signal processing circuit. Thus, the capacitances between each of the transmitter electrode group T1 and T2 and the corresponding receiver electrode are the same. First, the excitation signals are supplied to the block T1 and the phases of the signals detected by the receiver electrodes are obtained (these phases are referred to as first phases). Next, the excitation signals are supplied to the block T2 and the phases of the signals detected by the receiver electrodes are obtained (these phases are referred to as second phases). When the difference between the first phases and the second phases is in a predetermined range, the determined result is "normal (not polluted)". Otherwise, the determined result is "abnormal (polluted)". The user can know the determined result on the LCD display and determine whether to start the measurement mode or to clean the surfaces of the electrodes.

In the pollution detection mode, the number of transmitter electrodes of each block is not limited to four. Instead of four, each block may be constructed of any number of electrodes which is two or more. In addition, for example, blocks may be constructed in such a way that a first block is constructed of successive four transmitter electrodes and a second block is constructed of a total of four transmitter electrodes on the left and right of the fist block. The more combinations of different types of blocks are used, the smaller the determination error becomes.

FIGS. 9A to 9C are vector forms showing relations of phases of transmission signals and reception signals. These figures are for explaining the theory of operation of the pollution detection mode. A transmission signal vector X is formed by composing the sine wave signals whose phases differ by 45o each other as shown in FIG. 9A. The transmission signal vector X is detected to be a reception signal vector Y shown in FIG. 9B. The phase/theta/2 of the reception signal vector Y of the block T1 is the same as that of the block T2 unless a polluting substance is present between the electrodes. For the sake of simplicity of description, it is assumed that the phase/theta/1 of the transmission signal vector X is the same as the phase/theta/2 of the reception signal vector Y. However, in a real device, due to presence of capacitance and resistance of the signal detecting circuit, these phases are normally not the same.

As shown in FIGS. 8A and 8B, when a polluting substance Z is present between the 0o transmitter electrode of the electrode block T1 and the receiver electrode R, the phase component of 0o which constructs the reception signal vector varies. Thus, as shown in FIG. 9C, the phase/theta/3 of the reception signal vector Y differs from the phase/theta/2 of the reception signal vector Y in FIG. 9B. Consequently, by comparing the phase of the reception signal vector of each block, it can be determined whether a polluting substance is present between the electrodes.

Figure 10:
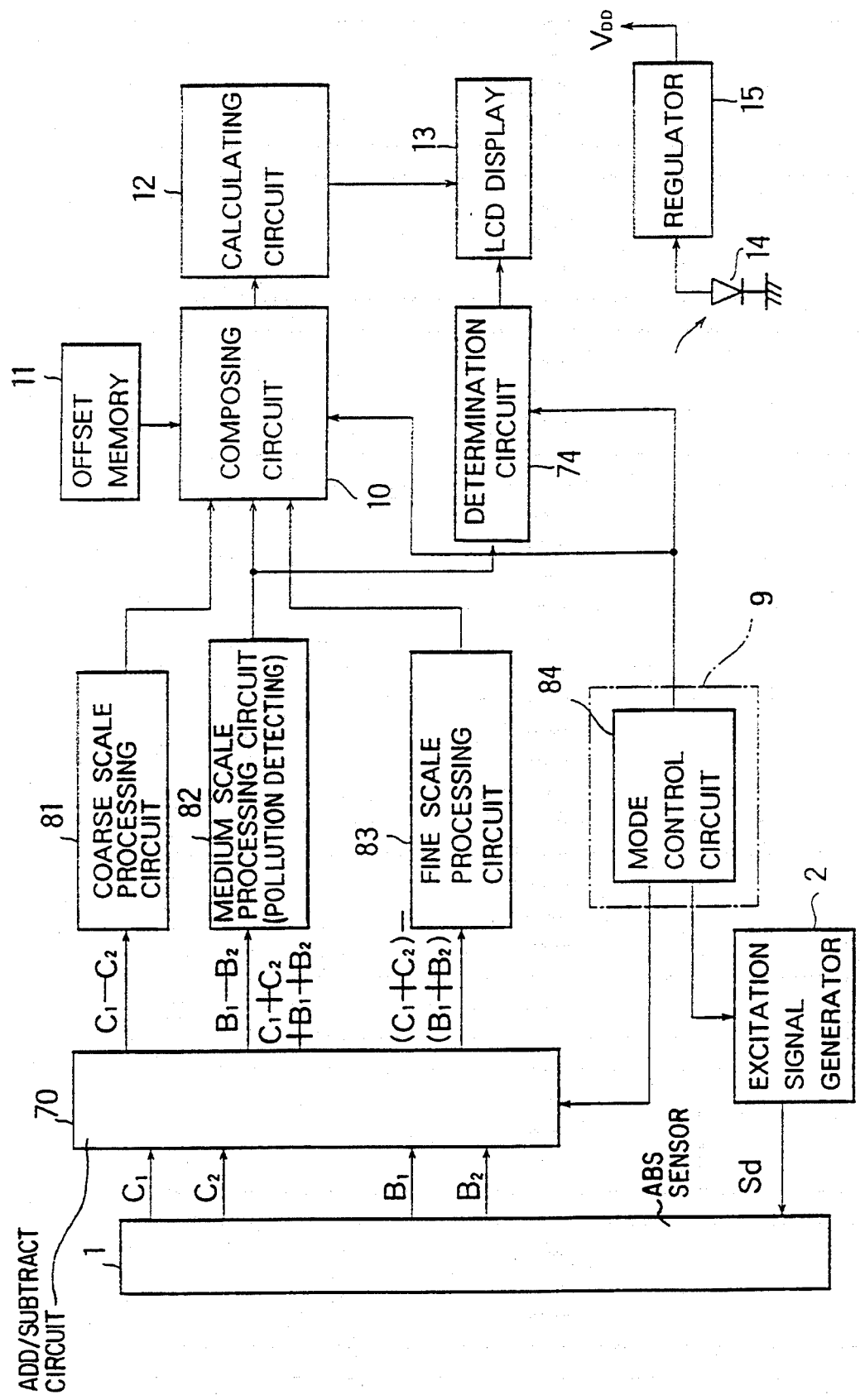
FIG. 10 is a block diagram showing the construction of an displacement measuring device according to a fourth embodiment of the present invention.

In the embodiment shown in FIG. 7, the dedicated signal processing circuits are provided for the normal displacement measurement mode and the pollution detection mode, and a mode switching operation is performed. In FIG. 10, another embodiment (hereinafter referred to as the fourth embodiment) is shown. In this embodiment, a signal processing circuit is used in common with both the displacement measurement mode and the pollution detection mode and switched on a time sharing basis. Since the basic construction of the fourth embodiment is the same as that of the third embodiment, for the same of simplicity, the portions according to the third embodiment are denoted by the same reference numerals thereof and their description is omitted.

In FIG. 10, reference numerals 81, 82, and 83 are coarse scale processing circuit, medium scale processing circuit, and fine scale processing circuit, respectively. The coarse scale processing circuit 81 includes both the coarse scale demodulator 3 and the coarse scale phase detector 6 which are shown in FIG. 7. Likewise, the medium scale processing circuit 82 includes both the medium scale demodulator 4 and the medium scale phase detector 7 which are shown in FIG. 7. Likewise, the fine scale processing circuit 83 includes both the fine scale demodulator 5 and the fine scale phase detector 8 which are shown in FIG. 7. In these signal processing circuits, the medium scale processing circuit 82 performs signal processing for both the normal displacement measurement mode and the pollution detection mode.

As opposed to the above-describe third embodiment, a mode control circuit 84 does not simply change the modes. Rather, the mode control circuit 84 performs the operation of the pollution detection mode while the interval operation of the normal displacement measurement mode is in idle state. Thus, the mode control circuit 84 operates as a part of the control circuit 9, which controls the interval measurement operation, shown in FIG. 1.

In the displacement measurement mode, excitation signals which are similar to those used in the above-described embodiments are sent to an ABS sensor 1. The output of the ABS sensor 1 is sent to an add/subtract circuit 70. The add/subtract circuit 70 performs calculations of (C1−C2), (B1−B2), and [(C1+C2)−(B1+B2)]. The calculated outputs are sent to each portion which performs signal processing such as demodulating and phase-detecting and then composites the resultant signals. Thus, a measured displacement value is output.

On the other hand, in the pollution detection mode, excitation signals similar to those of the above-described embodiments are sent to the ABS sensor 1. In this mode, the output of the ABS sensor 1 is sent to the add/subtract circuit 70. The add/subtract circuit 70 performs a calculation of (C1+C2+B1+B2). The output of the add/subtract 70 is sent to the medium scale processing circuit 82. The medium scale processing circuit 82 demodulates and detects the phase of the input data. The output of the medium scale processing circuit 82 is sent to a determination circuit 74. The determination circuit 74 determines whether or not a polluting substance is present. The operation of the pollution detection mode is performed while the operation of the displacement measurement mode is in idle state.

Figure 11:
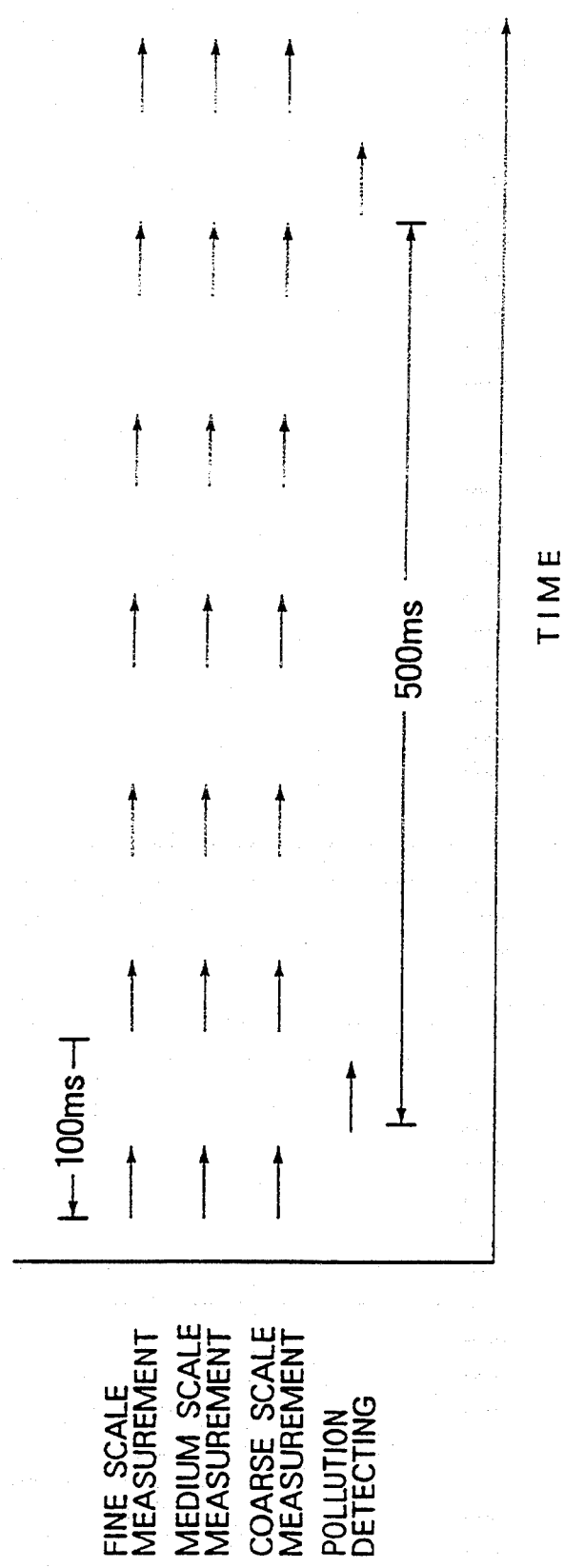
FIG. 11 is an operational timing chart showing a measurement mode and a pollution detection mode according to the fourth embodiment.

FIG. 11 is a timing chart showing an example of the operation of this embodiment. As shown in the figure, the displacement measurement operations with all the coarse scale, medium scale, and fine scale are periodically performed at intervals of 100 msec. While these displacement measurement operations are in idle state, the operation of the pollution detection mode is repeatedly performed at intervals of for example 500 msec.

In this embodiment, in the displacement measurement mode, as described in the embodiments shown in FIGS. 1 and 4, the intervals of the measurement operation are controlled according to the displacement of the ABS sensor or the voltages of the power supply.

According to the fourth embodiment, since the signal processing circuit is used in common with both the normal displacement measurement mode and the pollution detection mode, the device construction and circuit construction become simple. In particular, when the signal processing circuit is constructed of an IC chip, the increase of the IC scale can be effectively suppressed.

It should be noted that the operation of the pollution detection mode may not always repeated at predetermined intervals. For example, the pollution detecting operation may be performed once in an idle time at the beginning of the intermittent displacement measurement operation. Moreover, instead of the medium scale processing circuit, the coarse scale processing circuit 81 or the fine scale processing circuit 83 may be used in common with the pollution detecting signal processing circuit.

When a solar cell is used for the power supply of the incremental capacitance-type displacement measuring device, if the intensity of illumination exposed to the solar cell is lower than a predetermined value, the origin of measurement will be lost. Thus, the measurement result will become inaccurate. To prevent this problem, a charging circuit with a large capacity has been conventionally used so as to store an excessive power of the solar cell. However, in the absolute type displacement measuring device, the origin is not theoretically lost. Thus, the charging circuit necessary in the incremental type device is not required in the absolute type device. Nevertheless, when the absolute type displacement measuring device is temporarily used at a dark place and the measured data should be output or stored, even the absolute type displacement measuring device is preferably provided with a power storing means for allowing the device to measure data at a dark place for several seconds. When the conventional charging circuit is directly used in the absolute type displacement measuring device, it may take for example 10 to 30 minutes until electricity is fully charged.

To solve this problem, in the present invention, a new solar-cell-type power supply circuit which can charge electricity at high speed is used. The power supply circuit used in the present invention comprises a solar cell, a first condenser, a second condenser, a third condenser, a voltage detector circuit, and a switch control circuit. The first condenser is connected in parallel with the solar cell through a diode. The second condenser is connected in parallel through a first switch element, the capacitance of the second condenser being smaller than that of the first condenser. The third condenser is connected to the second condenser through a second switch element, the capacitance of the third condenser being larger than that of the first condenser. The voltage detector circuit detects the charged voltage of the first condenser. The switch control circuit is controlled by the output of the voltage detector circuit. When the charged voltage of the first condenser becomes to a predetermined value, the switch control circuit begins to control the first and second switch elements to turn on and off alternatively so as to charge excessive electricity of the first condenser to the third condenser through the second condenser. The voltage detector circuit preferably performs a intermittent voltage detecting operation at predetermined intervals. In this power supply circuit, a so-called switch capacitor integrator is constructed of the small-capacitance second condenser, the large-capacitance third condenser, and the first and second switch elements. The capacitance of the first condenser which is charged directly with the output of the solar cell is smaller than the that of the third condenser which stores an excessive power. Thus, the first condenser has a medium capacitance.

Therefore, comparing the full charging period of the first condenser and that of the third condenser which stores the excessive power, assuming that these condensers are directly charged from the solar cell, the former is shorter than the later. In addition, at a dark place where the solar cell does not work, the third condenser which is storing the excessive power of the first condenser allows the system to work for a short period of time.

When such a power supply circuit is used for the capacitance-type measuring device for absolute measurement of positions, since the measurement operation of the device is intermittently performed, the capacitance of the third condenser which charges the excessive power can be reduced on the order of three to four digits of the capacitance of the conventional charging condenser. In addition, when the ratio of capacitances of the first and second condensers is optimally designed, ripples will be effectively suppressed. Thus, in this construction, as opposed to the conventional power supply circuit, no filter is required. Thus, the mounting space of the device will be reduced. Moreover, when the voltage detector circuit is discretely operated, the power consumption will be effectively reduced.

FIG. 12 is a block diagram showing the construction of a capacitance-type measuring device for absolute measurement of position having the above-described power Supply circuit according to a fifth embodiment. In the figure, reference numeral 91 is a solar cell which is used as a power supply. A first condenser C1 is connected in parallel with the solar cell 91 through a diode D1. The terminal voltage of the first condenser C1 is regulated by a regulator 95 to for example 1.55 V. The regulated voltage is applied to a main system 96.

The first condenser C1 is used for initial charging. The terminals of the first condenser C1 are connected to a switched capacitor integrator 94 which charges and stores the excessive power of the first condenser C1. The switched capacitor integrator 94 comprises a second condenser C2 and a third condenser C3. The second condenser C2 is connected in parallel with the first condenser C1 through a first switch element S1. The third condenser C3 is connected in parallel with the second condenser C2 through a second switch element S2. The capacitances of the first condenser C1, the second condenser C2, and the third condenser C3 are designated as follows.

$$C2 < C1 < C3$$

The charging voltage of the first condenser C1 is detected by a voltage detector circuit 92. In this embodiment, the voltage detector circuit 92 performs a discrete detecting operation (which will be described later) with a system clock CK received from the main system 96. When the voltage detector circuit 92 has detected that the charging voltage of the first condenser C1 is a predetermined voltage, for example 2 V, detected output causes the a switch control circuit 93 to start controlling the first and second switch elements S1 and S2 to be alternatively turned on/off. The output of the switch control circuit 93 is sent directly to the first switch element S1. In addition, the output of the switch control circuit 93 is sent to the second switch element S2 through an inverter INV. Thus, the first and second switch elements S1 and S2 are alternatively turned on and off. As a result, the excessive power of the first condenser C1 is sent to the large-capacity third condenser C3 through the small-capacity second condenser C2. Thus, the excessive power is stored in the third condenser C3.

The large-capacity third condenser C3 stores the excessive power obtained at a bright place so as to supply electric power for a predetermined time at a dark place. The medium-capacity first condenser C1 is used for a temporary power storage portion so that the system can normally operate even if the voltage of the power supply drops. Unless the first condenser C1 is provided, when the third condenser C3 starts charging, the second condenser C2 charges electricity and thereby an sharp voltage drop takes place.

The terminal voltage of the third condenser C3 is applied to the voltage regulator 95 through a diode D2. When the first condenser C1 has an enough charged voltage a bright place, the charged voltage is regulated by the regulator 95 to be applied to the main system 96. At a dark place, the charged voltage of the first condenser C1 rapidly drops. At this point, the diode D2 is turned on, and the charged voltage of the third condenser C3 is applied to the voltage regulator 95. As a result, the system can perform the displacement measurement operation for a predetermined period of time at a dark place.

Figure 13:
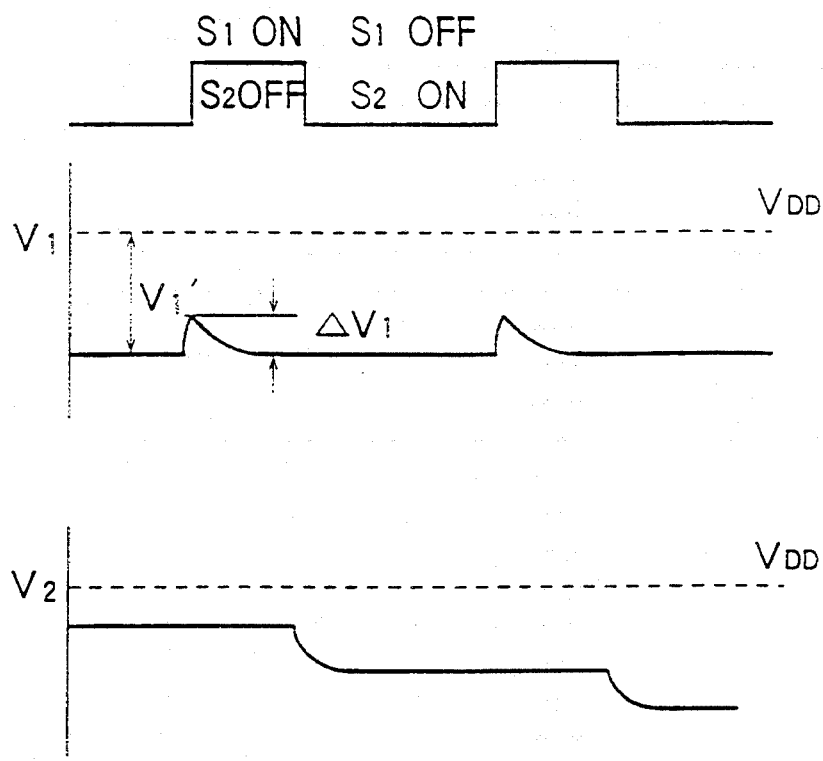
FIG. 13 is a waveform diagram for explaining the operation of the power supply circuit of FIG. 12.

Next, with reference to FIG. 13, the charging operation of the power supply circuit will be described in more detail. In the figure, V1 is the terminal voltage of the first condenser C1. V2 is the terminal voltage of the third condenser C3. Until the charged voltage of the first condenser C1 becomes to be 2 V, the switched capacitor integrator 94 does not operate. When the charged voltage of the first condenser C1 becomes to be 2 V, the voltage detector circuit 92 detects this charged voltage. Thus, the switch control circuit 93 starts to control the first and second switch elements S1 and S2 to be alternatively turned on and off. When the first switch element S1 is turned on, the charges of the first condenser C1 are distributed to the second condenser C2. When the first switch element S1 is turned off and the second switch element S2 is turned on, the charges of the second condenser C2 are distributed to the third condenser C3. These operations are repeated so that the excessive power of the first condenser C1 is stored in the third condenser C3.

When the first switch element S1 is turned on while the third condenser C3 is empty at (namely in the initial stage of the charging operation), a large voltage spike delta/V1 takes place. The value of voltage spike delta/V1 is given by the following formula.

$$/delta/V1 = V1'/dot/C2/(C1+C2)$$

where V1' is the charged voltage of the first condenser C1. If the first condenser C1 is not provided, as expressed by the above formula, /delta/V1 is equal to V1'. Thus, the voltage at the terminal N1 immediately becomes to be 0 V. Thereby, the system may malfunction.

In this embodiment, when the value of C2/(C1+C2) is properly set, the voltage spike/delta/V1 can be reduced. For example, in the conditions of V1'=2 V, C1=3.3/mu/F, and C2=0.1/mu/F, the above-described voltage spike/delta/V1 is approximately 60 mV.

Figure 14:
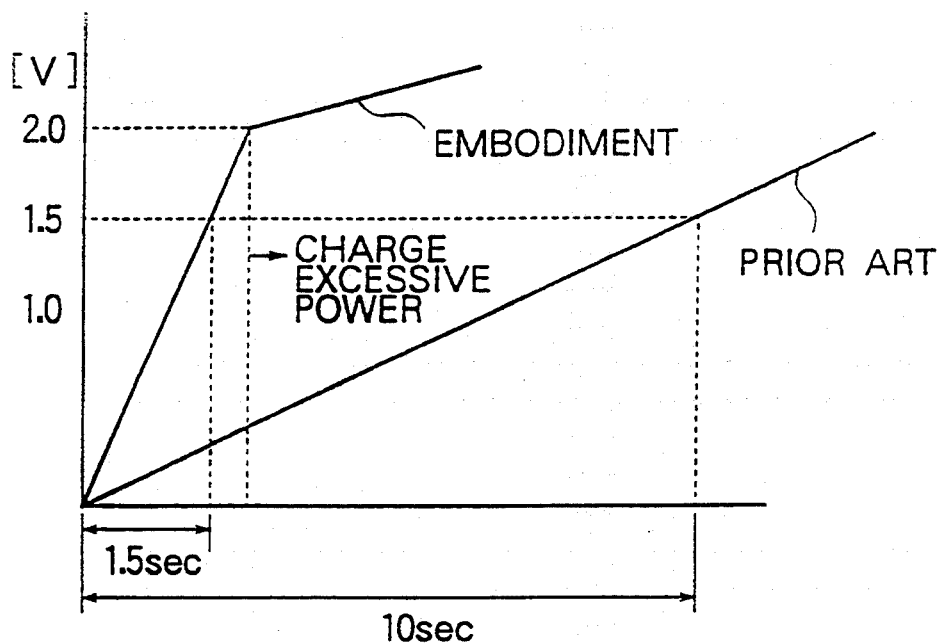
FIG. 14 is a graph for explaining the operation of the power supply circuit of FIG. 12.

FIG. 14 is a graph showing comparison of changes of charged voltages on time base with respect to the absolute type displacement measuring device according to this embodiment and a conventional incremental type displacement measuring device. In this case, the capacitance of the charging condenser which directly charged from the solar cell according to the conventional system is larger on the order of one digit than that of the first condenser C1. Assuming that the main system operates at 1.5 V or more, approximately 10 sec after the displacement sensor has been placed at a bright place, the conventional system will being to operate. On the other hand, in this embodiment, with the charging of the first condenser C1 whose capacitance is smaller on the order of one digit than that of the conventional system, as shown in FIG. 14, the system can operate in around 1.5 sec. With a voltage detecting point of 2 V, excessive power over this voltage is stored in the third condenser C3. Thereafter, even at a dark place, the measurement can be temporarily performed.

Figure 15:
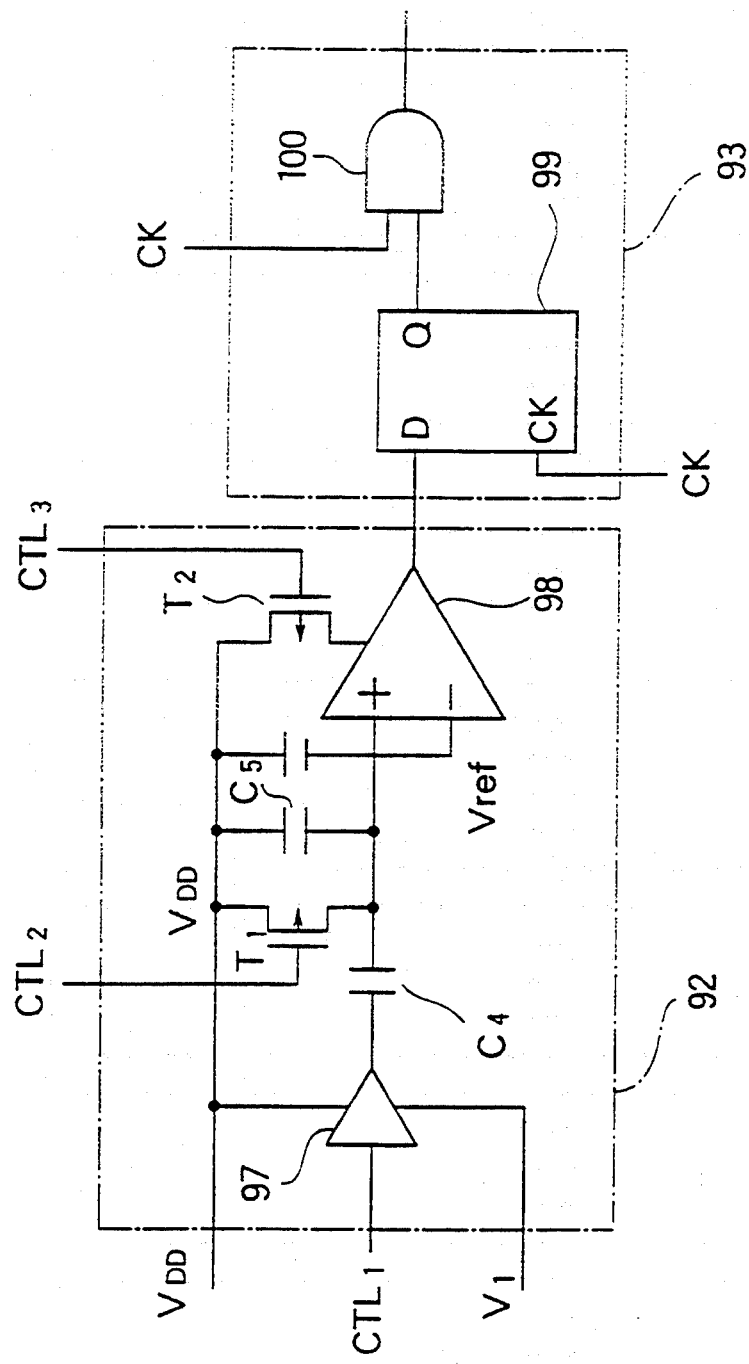
FIG. 15 is a circuit diagram showing the construction of a voltage detecting circuit and a switch circuit of FIG. 12.

FIG. 15 is a circuit diagram showing the construction of the voltage detector circuit 92 and the switch control circuit 93 shown in FIG. 12. The terminal voltage of the first condenser C1, namely VDD-V1, is applied to a buffer 97. In addition, a clock signal CTL1 which is in synchronization with the system clock CK is supplied to the buffer 97. Thus, the buffer 97 outputs a discrete signal according to the charging voltage and in synchronization with the clock signal CTL1.

The output of the buffer 97 is sent to a voltage divider circuit which is constructed of condensers C4 and C5. The output of the voltage divider circuit is supplied to a comparator 98. The comparator 98 compares the divider output with a reference voltage Vref. A p-channel MOS transistor T1, which is driven by a clock signal CTL2 with nearly inverse phase of the clock signal CTL1 to be used for a discharging element, is connected in parallel with the condenser C5 of the voltage divider circuit. A p-channel MOS transistor T2 is connected to the comparator 98 to turn on and off the power supply. The p-channel MOS transistor T2 is driven by a clock signal CTL3 which is in synchronization with the clock signal CTL1.

The switch control circuit 93 is constructed of a latch circuit 99 and an output gate 100. The latch circuit 99 which is a D-type flip-flop receives the output of the comparator 98. The output gate 100 obtains the output of the latch circuit 99 in synchronization with the system clock CK. The output gate 100 outputs a switch control signal.

FIG. 16 is a timing chart showing the operation of the circuit of FIG. 15. In a voltage detection stop period where the transistor T1 is on-state and the transistor T2 is off-state, the electricity of the condenser C5 is discharged, and the power supply of the comparator 98 is cut-off. In a voltage detection cycle where the transistor T1 is off-state and the transistor T2 is on-state, the voltage of the discrete output obtained from the buffer 97 is divided. The divided output V1/dot/C4/(C4+C5) and the reference voltage Vref are compared by the comparator 98. Each constant of the divided output V1/dot/C4/(C4+C5) and the reference voltage Vref are predetermined so that the output of the comparator 98 is obtained when the charging voltage is for example 2 V. The output of the comparator 98 is latched by a latch circuit 99. The output of the latch circuit 99 is obtained through the Gate 100 as a control signal which causes the switched capacitor to operate.

Figure 17:
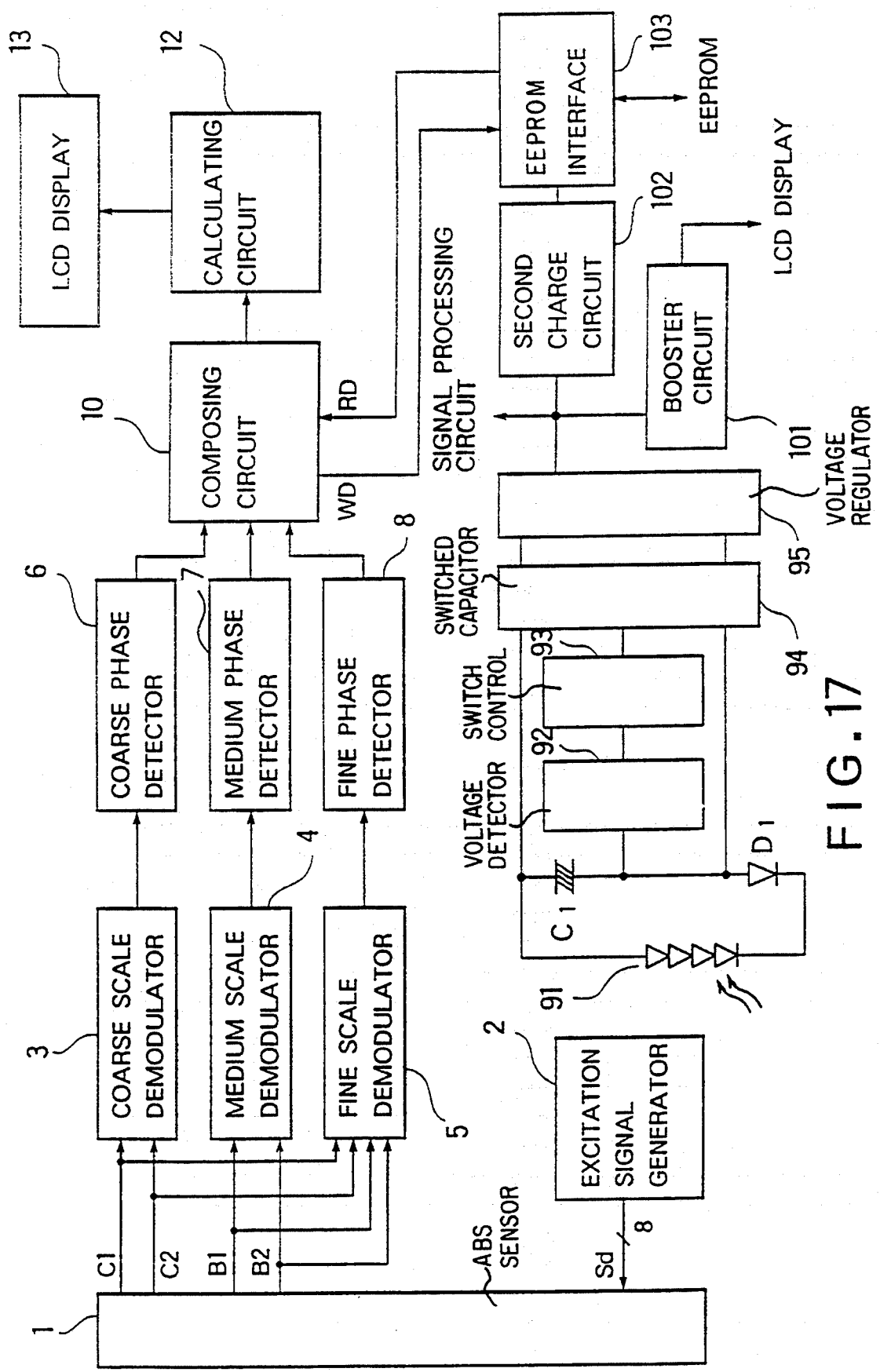
FIG. 17 is a block diagram showing the construction of a displacement measuring device having the power supply circuit of FIG. 12.

FIG. 17 is a block diagram showing the construction of a capacitance-type measuring apparatus for absolute measurement of positions having the above-described power supply circuit according to a fifth embodiment of the present invention.

For the sake of simplicity, the portions according to the above-described embodiments are denoted by the same reference numerals thereof and their description is omitted. The output of the power supply circuit using the solar cell 91 shown in FIG. 12, namely the power supply voltage of the voltage regulator 95, is applied to a signal processing circuit. The voltage obtained by the voltage regulator 95 is boosted by a booster circuit 101 and then applied to the LCD display 13.

The solar cell 91, a voltage detector circuit 92, a switch control circuit 93, and a switched capacitor integrator 94 construct a so-called first charge circuit. In addition to the first charge circuit, a second charge circuit 102 is provided. The second charge circuit 102 is connected to the output of the voltage regulator 95. A high voltage obtained by the second charge circuit 102 is used for writing and erasing data to/from an EEPROM (not shown). The high voltage is supplied to the EEPROM through an EEPROM interface.

In this embodiment, like the first embodiment shown in FIG. 1 and the second embodiment shown in FIG. 4, the interval measurement operation is performed according to the movement state of the ABS sensor or according to the voltages of the power supply.

In the above-described embodiments, an ON/OFF signal output from the control circuit 9 which controls the interval measurement operation can be supplied to all the circuit elements of the signal processing circuit in the same timing. Moreover, the ON/OFF signal may be supplied to a plurality of blocks of the signal processing circuit in different timings.

Figure 18:
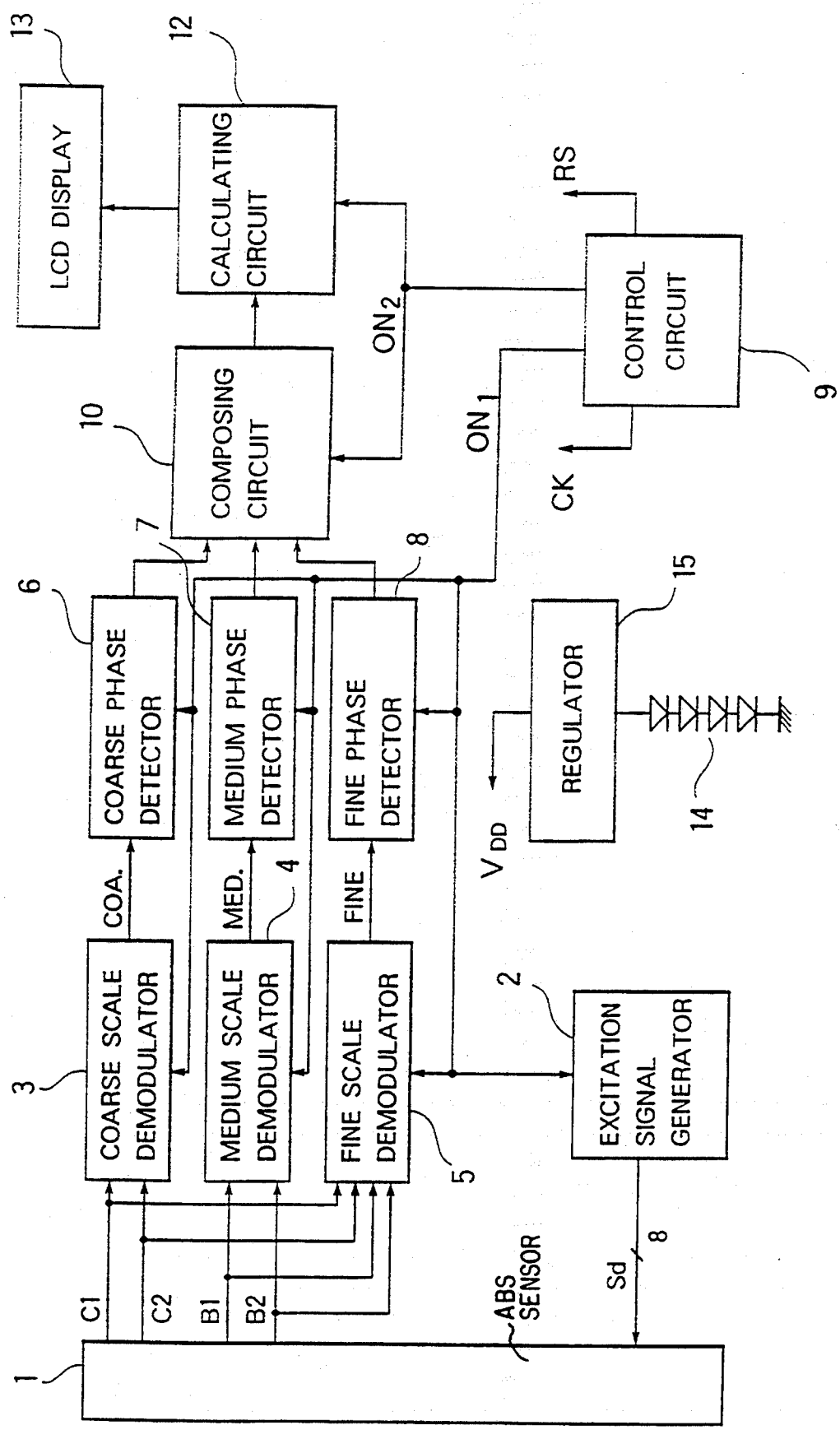
FIG. 18 is a block diagram showing the construction of a displacement measuring device according to a sixth embodiment of the present invention.

FIG. 18 is a block diagram showing the construction of a capacitance-type measuring device for absolute measurement of positions according to a sixth embodiment of the present invention. In this figure, for the sake of simplicity, the portions according to the above-described embodiments are denoted by the same reference numerals thereof and their description is omitted. In this embodiment, the control circuit 9 controls each circuit so as to perform an periodical measurement operation in a predetermined display refresh cycle. The control circuit 9 generates a first activation signal ON1 and a second activation signal ON2 with different timings so as to control the interval measurement operation. The first activation signal ON1 is supplied to an excitation signal generator 2, demodulators 3, 4, and 5 (which are analog circuits), and phase detectors 6, 7, and 8. The second activation signal ON2 is supplied to a digital composing circuit 10 and a digital calculating circuit 12 which composite and calculate the outputs of phase detectors 6, 7, and 8. In addition to the activation signals ON1 and ON2, the control circuit 9 also supplies a clock signal CK and a reset signal RS to each circuit as in the above-described embodiments. The construction of the block circuit activating method for the interval measurement operation according to this embodiment may be applied to the first to fifth embodiments which are shown in FIGS. 1, 4, 7, 10, and 17.

Figure 19:
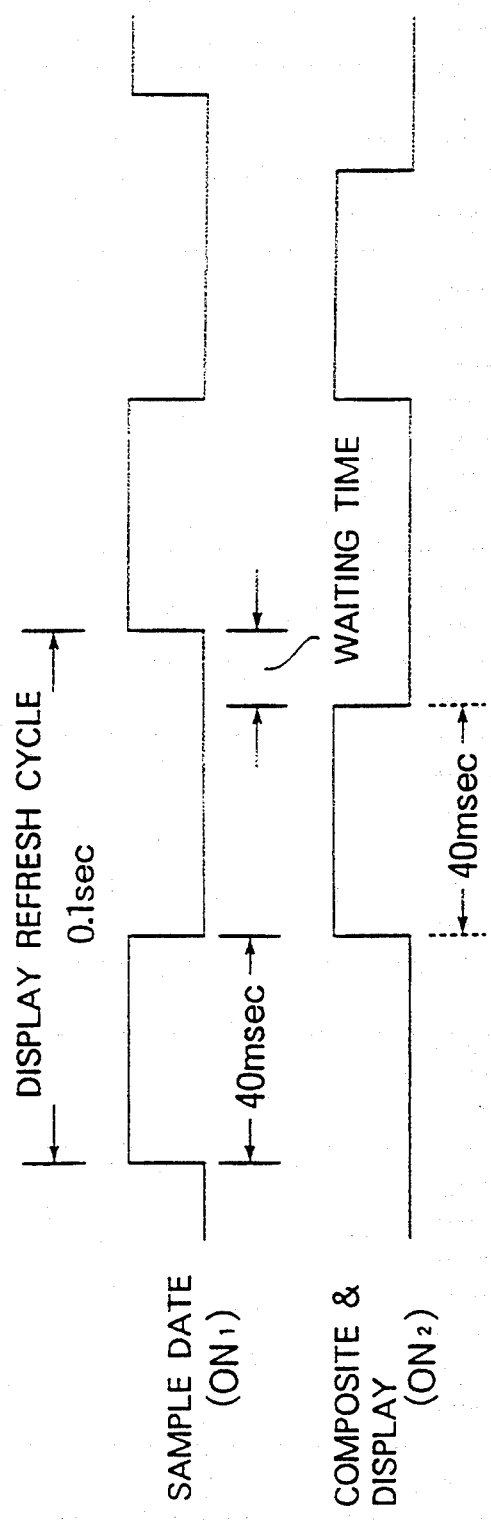
FIG. 19 is an operational timing chart of the sixth embodiment.

FIG. 19 is a waveform diagram showing the interval measurement operation of the device according to the sixth embodiment. If the display refresh cycle is so long, it seems that the LCD display 13 does not follow the movement of the ABS sensor 1, and data display becomes to be unnatural. On the other hand, if the display refresh cycle is too short, while the ABS sensor is moving at high speed, data cannot be easily obtained. An experiment shows that a preferable display refresh cycle is 0.1 sec. Within this display refresh cycle, a data extraction period caused by the first activation signal ON1 is set at 40 msec, and a composite and display period caused by the second activation signal ON2 is set at 40 msec. The data extraction period is followed by the composite and display period.

The remaining period of the display refresh cycle is a waiting period. However, the waiting period is not always necessary. In other words, at first the display refresh cycle is set. Within the display refresh cycle, the data extraction period and the compose and display period are set. The remaining period becomes the waiting period.

The periods of the demodulated signals obtained from the demodulators 3, 4, and 5 depend on the speed and direction of the movement of the ABS sensor 1. The change of period becomes larger and larger as the speed of the movement of the ABS sensor 1 becomes higher. The change of period of the demodulated signals largely vary in the order of the fine scale phase signal CMP FINE, medium scale phase signal CMP MED, and coarse scale phase signal CMP COA. In consideration of these conditions, the data extraction period, namely the ON-period of the first excitation signal ON1, is set. For example, if the data extraction period is set at 50 msec and the composite and display period followed thereby is set at 50 msec, the waiting period becomes 0.

According to this embodiment, by the interval measurement operation, the power consumption of the system can be effectively reduced. In particular, the power consumption effect is significant for the demodulators which dissipate a large amount of current in the signal processing circuit. Thus, when a solar cell is used for the power supply, the measurement operation can be performed with a relatively low intensity of illumination. In addition, when a battery is used for the power supply, the service life thereof can be prolonged.

In the above embodiments, devices which measure displacement in three levels of coarse, medium, and fine scales have been described. However, the present invention is not limited to these devices. In addition, the present invention can be applied to a capacitance-type measuring device for absolute measurement of positions in a single scale.

Additional advantages and modifications will be readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A power-conserving capacitance-type measuring device for absolute measurement of positions, comprising:

displacement sensing means having a fixed element and a movable element, said movable element being capacitance-coupled to said fixed element and relatively movable with respect to said fixed element, for outputting signals corresponding to relative positions of said movable element with respect to said fixed element;

signal processing means for processing the output signals of said displacement sensing means and outputting an absolute measurement value corresponding to displacement of said movable element with respect to said fixed element;

state detecting means for detecting whether said movable element of said displacement sensing means is in a moving or a stopped state and for outputting a state signal indicative of the detected state;

control means for controlling the operations of said displacement sensing means and said signal processing means and for periodically activating said signal processing means at a selected interval so as to perform a cyclic intermittent measurement operation regardless of the detected state of said movable element; and power supply means for supplying electric power to said displacement sensing means, said signal processing means, said control means and said state detecting means; said control means selecting the interval of the intermittent measurement operation based on the output of said state detecting means so as to reduce power consumption by said signal processing means.

2. The measuring device according to claim 1 wherein:

said power supply means is a battery.

3. The measuring device according to claim 1 wherein said power supply means comprises:

a solar cell;

a first condenser having a first capacitance connected in parallel with said solar cell;

a second condenser having a second capacitance connected in parallel with said first condenser through a first switch element, said second capacitance being lower than said first capacitance;

a third condenser having a third capacitance connected in parallel with said second condenser through a second switch element, said third capacitance being larger than said first capacitance;

charging voltage detecting means for detecting a voltage stored in said first condenser and outputting a detection signal indicative of the stored voltage; and switch control means controlled by said detection signal for alternatively turning said first and second switch elements on or off after said first condenser voltage becomes a predetermined value and for supplying excessive electricity of said first condenser to said third condenser through said second condenser.

4. The measuring device according to claim 1 wherein:

said control means initiates a pollution detection mode during an idle period between the intermittent measurement operations.

5. The measuring device according to claim 1 wherein:

said signal processing means is divided into a plurality of circuit blocks that are respectively activated at different timings by said control means.

6. The measuring device according to claim 1 further comprising:

voltage detecting means for detecting an output voltage of said power supply means and for outputting a voltage detection signal; and wherein said control means controls the interval of the intermittent measurement operation based on at least one of said state signal and said voltage detection signals.

7. The measuring device according to claim 1 wherein said signal processing means comprises:

demodulating means for processing the output signals of said displacement sensing means so as to obtain cyclic square wave signals and for detecting at least two levels of displacement corresponding to a coarse displacement scale and to a fine displacement scale, respectively, each edge of the square wave signals providing phase information;

phase detecting means for detecting said phase information from each square wave signal obtained by said demodulating means so as to obtain phase data corresponding to at least said coarse and said fine scale displacements; and combining means for combining said coarse scale and fine scale displacement phase data obtained by said phase detecting means so as to obtain the absolute measurement value corresponding to displacement of said movable element with respect to said fixed element.

8. The measuring device according to claim 7 wherein said control means activates said demodulating means and said phase detecting means for a predetermined period and successively activates said combining means for a predetermined period in each cycle of said intermittent measurement operation.

9. A capacitance-type measuring device for absolute measurement of positions comprising:

displacement sensing means having a fixed element and a movable element, said movable element being capacitance-coupled to said fixed element and relatively movable with respect to said fixed element, for outputting signals corresponding to relative positions of said movable element with respect to said fixed element;

signal processing means for processing the output signals of said displacement sensing means and outputting an absolute measurement value corresponding to displacement of said movable element with respect to said fixed element;

control means for controlling the operations of said displacement sensing means and said signal processing means and for periodically activating said signal processing means at a selected interval so as to perform a cyclic intermittent operation regardless of whether said movable element is moving, said control means selecting the interval of the intermittent measurement operation based on the output of voltage detecting means;

said voltage detecting means for detecting an output voltage of power supply means and outputting a voltage detection signal; and said power supply means for supplying electric power to said displacement sensing means, said signal processing means, said control means and said voltage detecting means.

10. The measuring device according to claim 9 wherein:

said power supply means is a battery.

11. The measuring device according to claim 9 wherein said power supply means comprises:

a solar cell;

a first condenser having a first capacitance connected in parallel with said solar cell;

a second condenser having a second capacitance connected in parallel with said first condenser through a first switch element, said second capacitance being lower than said first capacitance;

a third condenser having a third capacitance connected in parallel with said second condenser through a second switch element, said third capacitance being larger than said first capacitance;

charging voltage detecting means for detecting a voltage stored in said first condenser and outputting a detection signal indicative of the stored voltage; and switch control means controlled by said detection signal for alternatively turning said first and second switch elements on or off after a voltage of said first condenser becomes a predetermined value and for supplying excessive electricity of said first condenser to said third condenser through said second condenser.

12. The measuring device according to claim 9 wherein:

said first control means further comprises measurement mode control means for initiating a pollution detection mode during an idle period between the intermittent measurement operations.

13. The measuring device according to claim 9 wherein:

said signal processing means is divided into a plurality of circuit blocks that are respectively activated at different timings by said control means.

14. The measuring device according to claim 9 wherein said signal processing means comprises:

demodulating means for processing the output signals of said displacement sensing means so as to obtain cyclic square wave signals and for detecting at least two levels of displacement corresponding to a coarse displacement scale and to a fine displacement scale, respectively, each edge of the square wave signals providing phase information;

phase detecting means for detecting said phase information from each square wave signal obtained by said demodulating means so as to obtain phase data corresponding to at least said coarse and said fine scale displacements; and means for combining said coarse scale and fine scale displacement phase data obtained by said phase detecting means so as to obtain the absolute measurement value corresponding to displacement of said movable element with respect to said fixed element.

15. The measuring device according to claim 14 wherein said control means activates said demodulating means and said phase detecting means for a predetermined period and successively activates said combining means for a predetermined period in each cycle of said intermittent measurement operation.

16. A power-conserving, noncontacting-type measurement device for absolute measurement of positions, comprising:

a sensor that produces an output when energized comprising:

a first element;

a second element movable relative to the first element; and an electrode structure configured so as to vary the sensor output according to the relative displacement position of the second element with respect to the first element, such that the present absolute position of the second element relative to the first element can be derived from the present sensor output;

signal processing circuitry that intermittently processes the sensor output to produce a measurement output that is indicative of the absolute position of the second element;

a motion state detector, responsive to a signal derived from the sensor output, that determines whether the second element is in a moving or a stopped state and produces an output indicative of the determined motion state; and a system controller that controls the activation of the signal processing circuitry responsive to the motion state detector output to control the interval between successive measurement outputs by the signal processing circuitry and thereby reduce power consumption by said signal processing circuitry.

17. The measurement device of claim 16 wherein the electrode structure capacitively couples the first and second elements.

18. The measurement device of claim 16 wherein the motion state detector is responsive to the measurement output produced by the signal processing circuitry.

19. The measurement device of claim 16 wherein the system controller controls the interval at which the motion state determination is made.

20. The measurement device of claim 16 wherein the controller periodically activates the signal processing circuitry to intermittently produce the measurement output at a selected interval regardless of the detected motion state of the second element, the selected interval being selected according to the detected motion state.

21. The measurement device of claim 20 further comprising a power source, and wherein the system controller controls the activation of the signal processing circuitry responsive to the output level of the power source to vary the interval between successive measurement outputs by the signal processing circuitry.

22. A power-conserving, noncontacting-type measurement device for absolute measurement of positions, comprising:

a sensor that produces an output when energized comprising:

a first element;

a second element movable relative to the first element; and an electrode structure effective to vary the sensor output according to the relative displacement position of the second element with respect to the first element, such that the present absolute position of the second element relative to the first element can be derived from the present sensor output;

signal processing circuitry that intermittently processes the sensor output to produce a first measurement output, and a second measurement output derived from the first measurement output that is indicative of the absolute position of the second element;

a motion state detector, responsive to a signal derived from the sensor output, that determines whether the second element is in a moving or a stopped state and produces an output indicative of the determined motion state; and a system controller that controls the activation of the signal processing circuitry responsive to the motion state detector output to control the interval between successive second measurement outputs by the signal processing circuitry and thereby reduce power consumption by said signal processing circuitry.

23. The measurement device of claim 22 wherein the motion state detector is responsive to the second measurement output, and the controller periodically activates the signal processing circuitry to produce the second measurement output at a selected interval regardless of the detected motion state of the second element, the interval being selected according to the detected motion state.

* * * * *